(12) United States Patent
Yerramalli et al.

(10) Patent No.: US 12,058,716 B2
(45) Date of Patent: Aug. 6, 2024

(54) GROUP BASED SCHEDULED AND AUTONOMOUS UPLINK COEXISTENCE

(71) Applicant: QUALCOMM Incorporated, San Diego, CA (US)

(72) Inventors: Srinivas Yerramalli, San Diego, CA (US); Jing Sun, San Diego, CA (US); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 17/571,293

(22) Filed: Jan. 7, 2022

(65) Prior Publication Data

US 2022/0132515 A1    Apr. 28, 2022

Related U.S. Application Data

(62) Division of application No. 16/261,203, filed on Jan. 29, 2019, now Pat. No. 11,224,048.

(30) Foreign Application Priority Data

Feb. 16, 2018 (IN) .............................. 201841006008

(51) Int. Cl.
  *H04B 7/06*    (2006.01)
  *H04B 1/10*    (2006.01)
  (Continued)

(52) U.S. Cl.
  CPC ........ *H04W 72/541* (2023.01); *H04B 1/1027* (2013.01); *H04B 7/06968* (2023.05);
  (Continued)

(58) Field of Classification Search
  CPC .............. H04B 7/06968; H04B 7/0695; H04B 7/06952; H04B 7/088; H04W 72/232;
  (Continued)

(56) References Cited

U.S. PATENT DOCUMENTS

| 11,224,048 B2 | 1/2022 | Yerramalli et al. |
| 2011/0038355 A1 | 2/2011 | Chou |

(Continued)

FOREIGN PATENT DOCUMENTS

| WO | WO-2016198123 A1 | 12/2016 |
| WO | WO-2017099860 A1 | 6/2017 |

(Continued)

OTHER PUBLICATIONS

3GPP, "TR 38.912 V14.1.0", Jun. 2017, pp. 1-74 (Year: 2017).*

(Continued)

*Primary Examiner* — Salvador E Rivas
(74) *Attorney, Agent, or Firm* — QUALCOMM Incorporated

(57) ABSTRACT

Methods, systems, and devices for wireless communications are described. A user equipment (UE) may receive, from a base station, a group identifier of the UE. The UE may receive, from the base station, an indication of one or more group identifiers associated with scheduled communications with the base station during a time period. The UE may contend, based at least in part on the group identifier of the UE and the one or more group identifiers received from the base station, for access to a set of autonomous uplink (AUL) resources during the time period. The UE may perform, based at least in part on the contending, an AUL transmission to the base station using the set of autonomous uplink resources.

6 Claims, 18 Drawing Sheets

(51) Int. Cl.
| | |
|---|---|
| *H04L 61/5069* | (2022.01) |
| *H04W 4/08* | (2009.01) |
| *H04W 28/02* | (2009.01) |
| *H04W 72/02* | (2009.01) |
| *H04W 72/0446* | (2023.01) |
| *H04W 72/121* | (2023.01) |
| *H04W 72/232* | (2023.01) |
| *H04W 72/541* | (2023.01) |
| *H04W 74/00* | (2009.01) |
| *H04J 11/00* | (2006.01) |
| *H04W 74/0808* | (2024.01) |

(52) U.S. Cl.
CPC ........... *H04L 61/5069* (2022.05); *H04W 4/08* (2013.01); *H04W 28/0236* (2013.01); *H04W 72/02* (2013.01); *H04W 72/0446* (2013.01); *H04W 72/121* (2013.01); *H04W 72/232* (2023.01); *H04W 74/004* (2013.01); *H04W 74/006* (2013.01); *H04B 7/06952* (2023.05); *H04J 11/005* (2013.01); *H04W 74/0808* (2013.01)

(58) Field of Classification Search
CPC ........... H04W 72/0413; H04W 74/004; H04W 74/006
See application file for complete search history.

(56) References Cited

U.S. PATENT DOCUMENTS

| | | | | |
|---|---|---|---|---|
| 2018/0042000 | A1* | 2/2018 | Zhang | H04W 72/23 |
| 2018/0295651 | A1 | 10/2018 | Cao et al. | |
| 2019/0208540 | A1* | 7/2019 | Kim | H04W 74/006 |
| 2019/0246395 | A1* | 8/2019 | Huang | H04W 72/12 |
| 2020/0187236 | A1* | 6/2020 | Moon | H04L 1/00 |
| 2020/0336193 | A1* | 10/2020 | Park | H04W 76/28 |

FOREIGN PATENT DOCUMENTS

| | | |
|---|---|---|
| WO | WO-2017165405 A2 | 9/2017 |
| WO | WO-2018184440 A1 | 10/2018 |
| WO | WO-2019042270 A1 | 3/2019 |

OTHER PUBLICATIONS

R2-152214, "Uplink transmission for LAA", May 2015, pp. 1-5 (Year: 2015).*
Ericsson: "On AUL Support on LAA sCell", 3GPP Draft, 3GPP TSG RAN WG1 Meeting #90, R1-1713310, Prague, Czech Republic, Aug. 21-25, 2017, 5 Pages.
Intel Corporation: "Uplink Transmission for LAA", 3GPP TSG RAN WG2 Meeting #90, R2-152214_LAA_UP_LBT_V1, 3rd Generation Partnership Project (3GPP), Mobile Competence Centre, 650, Route Des Lucioles, F-06921 Sophia-Antipolis Cedex, France, vol. RAN WG2, No. Fukuoka, Japan, May 25-2015-May 29, 2015, May 16, 2015, 5 Pages, May 24, 2015, XP050973840, Retrieved from the Internet: URL: http://www.3gpp.org/ftp/tsg_ran/WG2_RL2/TSGR2_90/Docs/ [retrieved on May 16, 2015], 5 pages, p. 2, lines 13-26.
International Preliminary Report on Patentability—PCT/US2019/015912, The International Bureau of WIPO—Geneva, Switzerland, Aug. 27, 2020.
International Search Report and Written Opinion—PCT/US2019/015912—ISA/EPO—Jun. 5, 2019.
Mediatek Inc: "CLI Measurements in NR", 3GPP TSG RAN WG1 NR Ad-Hoc#2, R1-1710818, Qingdao, P.R. China, Jun. 27-30, 2017, 5 Pages.
Partial International Search Report—PCT/US2019/015912—ISA/EPO—Apr. 12, 2019.
Qualcomm Incorporated: "Resource Allocation for Autonomous UL Access", 3GPP Draft; R1-1720404 Resource Allocation for Autonomous UL Access, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051369967, Retrieved from the Internet: URL:http://www.3gpp.org/ftp/tsg%5Fran/WG1%5FRL1/TSGR1%5F91/Docs/ [retrieved on Nov. 18, 2017], sections 2.1-2.2, 5 pages.

* cited by examiner

GROUP BASED SCHEDULED AND AUTONOMOUS UPLINK COEXISTENCE

CROSS REFERENCE

The present Application for Patent is a Divisional of U.S. patent application Ser. No. 16/261,203 by YERRAMALLI, et al., entitled "GROUP BASED SCHEDULED AND ANUTONOMOUS UPLINK COEXISTENCE" filed Jan. 29, 2019, which claims the benefit of India Provisional Patent Application No. 201841006008 by YERRAMALLI, et al., entitled "GROUP BASED SCHEDULED AND AUTONOMOUS UPLINK COEXISTENCE," filed Feb. 16, 2018, assigned to the assignee hereof, and expressly incorporated by reference herein in its entirety.

BACKGROUND

The following relates generally to wireless communications, and more specifically to group based scheduled and autonomous uplink coexistence.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

In some wireless communications systems, wireless devices may be operable to support autonomous uplink (AUL) transmissions and/or scheduled uplink (SUL) transmissions. The AUL/SUL transmissions may be performed using fixed or static resources that overlap, at least in some instances and to some degree. In some examples, the AUL/SUL transmissions may be operable in a wireless communications system that operates on a shared or unlicensed radio frequency spectrum band. Such operations may include the devices contending for a channel using a clear channel assessment (CCA) procedure or a listen-before-talk (LBT) procedure, prior to performing the transmissions.

In the scenario where the AUL transmission resources overlap with SUL transmission resources, the AUL device may attempt to monitor for SUL transmissions, e.g., during an LBT procedure, and, if detected, defer the AUL transmission. However, in some instances the AUL device may be unable to detect the SUL transmission, but be located close enough to the SUL device that AUL transmissions would interfere with and/or be interfered by the SUL transmissions. Possible solutions to avoid this include avoiding overlapping AUL/SUL resources, which often results in wasted resources and/or reduced AUL/SUL capabilities.

SUMMARY

The described techniques relate to improved methods, systems, devices, or apparatuses that support group based scheduled and autonomous uplink coexistence. Generally, the described techniques provide a mechanism that support coexistence between autonomous uplink (AUL) transmissions and scheduled uplink (SUL) transmissions. Broadly, the described techniques provide for a base station to group devices into one or more groups to minimize interference caused by AUL/SUL transmissions on overlapping (or partially overlapping) resources. In some aspects, the base station may receive an indication from one or more UEs of any neighboring UEs that the UE is within communication range of. The base station may create and/or update groups of UEs based on the indications. The base station may transmit to one or more of the UEs an indication of which group(s) that the UEs are in, e.g., a group identifier (ID) for the UE. The base station may then schedule communications during a time period, e.g., for a particular slot, and then transmit an indication of the group identifier(s) that are scheduled for communications during that slot. For example, the base station may schedule SUL configured UEs for communications during the slot in which AUL configured UEs within the same group are communicating. This may ensure that the SUL transmissions can be detected by the AUL configured UEs.

The AUL configured UEs may receive the group identifier and the indication of which group identifiers are scheduled for communications during the slot. Accordingly, the AUL configured UEs may contend for access for AUL resources during the slot. If successful, they may perform AUL transmissions using the AUL resources. However, if SUL configured UEs are communicating during the slot, the AUL configured UEs may detect the SUL transmissions and perform a backoff to wait for the next available transmission opportunity. AUL configured UEs that are not within a group included in the indication of which group identifiers are scheduled for communications during the slot may avoid contending for the channel during the slot in order to reduce potential interference. Thus, the base station can receive AUL and/or SUL transmissions from UEs within a group(s) during the slot.

In some aspects, such as in a millimeter wave (mmW) wireless communication system, the base station may avoid AUL/SUL transmission interference by providing a reservation signal to AUL configured UEs. For example, the base station may use a wide beam with to transmit the reservation signal indicating that downlink communications are being performed with one or more UEs. AUL configured UEs within the wide beam width may use this reservation signal as an indication to avoid AUL transmissions during that period. Accordingly, the base station may perform the downlink transmissions to the one or more UEs.

A method of wireless communication at a UE is described. The method may include receiving, from a base station, a group identifier of the UE, receiving, from the base station, an indication of one or more group identifiers associated with scheduled communications with the base station during a time period, contending, based at least in part on the group identifier of the UE and the one or more group identifiers received from the base station, for access to a set of AUL resources during the time period, and performing, based at least in part on the contending, an AUL transmission to the base station using the set of autonomous uplink resources.

Another apparatus for wireless communication at a UE is described. The apparatus may include a processor, memory in electronic communication with the processor, and instructions stored in the memory. The instructions may be operable to cause the processor to receive, from a base station, a group identifier of the UE, receive, from the base station, an indication of one or more group identifiers associated with scheduled communications with the base station during a time period, contend, based at least in part on the group identifier of the UE and the one or more group identifiers received from the base station, for access to a set of AUL resources during the time period, and perform, based at least in part on the contending, an AUL transmission to the base station using the set of autonomous uplink resources.

Some examples of the method and apparatus described above may further include processes, features, means, or instructions for performing one or more instances of a UE-to-UE measurement procedure. Some examples of the method and apparatus described above may further include processes, features, means, or instructions for transmitting a feedback message to the base station based at least in part on the UE-to-UE measurement procedure, where the group identifier of the UE may be based at least in part on the feedback message.

Some examples of the method and apparatus described above may further include processes, features, means, or instructions for determining, during the UE-to-UE measurement procedure, that one or more neighboring UEs may be associated with receive power levels above a threshold value. Some examples of the method and apparatus described above may further include processes, features, means, or instructions for configuring the feedback message to indicate an identifier for the one or more neighboring UEs.

Some examples of the method and apparatus described above may further include processes, features, means, or instructions for repeating the UE-to-UE measurement procedure and transmitting the feedback message based at least in part on: a periodic schedule, or an aperiodic schedule, or a change in receive power levels for a neighboring UE above a threshold value, or a mobility state of the UE, or a combination thereof.

In some examples of the method and apparatus described above, the UE-to-UE measurement procedure may include a new radio (NR) cross-link interference (CLI) procedure.

In some examples of the method and apparatus described above, a common downlink control indicator (DCI), or a medium access control (MAC) control element (CE), or a radio resource control (RRC) message, or a combination thereof.

In some examples of the method and apparatus described above, the indication of the one or more group identifiers may be received in a common downlink control indicator (DCI).

Some examples of the method and apparatus described above may further include processes, features, means, or instructions for receiving a second group identifier that may be associated with a second communication type, where the group identifier may be associated with a first communication type.

A method of wireless communication at a base station is described. The method may include transmitting, to a UE, a group identifier of the UE, transmitting an indication of one or more group identifiers associated with scheduled communications with the base station during a time period, where the one or more group identifiers includes the group identifier of the UE, and receiving an AUL transmission from the UE over AUL resources during the time period based at least in part on the indication.

Another apparatus for wireless communication at a base station is described. The apparatus may include a processor, memory in electronic communication with the processor, and instructions stored in the memory. The instructions may be operable to cause the processor to transmit, to a UE, a group identifier of the UE, transmit an indication of one or more group identifiers associated with scheduled communications with the base station during a time period, where the one or more group identifiers includes the group identifier of the UE, and receive an AUL transmission from the UE over AUL resources during the time period based at least in part on the indication.

Some examples of the method and apparatus described above may further include processes, features, means, or instructions for receiving from each UE of a plurality of UEs, an indication of neighboring UEs. Some examples of the method and apparatus described above may further include processes, features, means, or instructions for grouping the plurality of UEs into the one or more groups of UEs based at least in part on the neighboring UEs. Some examples of the method and apparatus described above may further include processes, features, means, or instructions for scheduling communications for each of the one or more groups of UEs according to the grouping.

In some examples of the method and apparatus described above, the indication of the neighboring UEs may be received in a feedback message that may be based at least in part on UE-to-UE measurement procedures performed between the plurality of UEs. In some examples of the method and apparatus described above, the grouping may be based at least in part on the feedback messages.

Some examples of the method and apparatus described above may further include processes, features, means, or instructions for determining, based at least in part on the feedback messages, that one or more neighboring UEs to a UE may be associated with receive power levels above a threshold value. Some examples of the method and apparatus described above may further include processes, features, means, or instructions for where grouping the plurality of UEs into one or more groups of UEs may include grouping the UE associated with the feedback message and the one or more neighboring UEs into a group of UEs.

Some examples of the method and apparatus described above may further include processes, features, means, or instructions for repeating the receiving of the feedback messages and grouping the plurality of UEs based at least in part on: a periodic schedule, or an aperiodic schedule, or a change in receive power levels between neighboring UEs above a threshold value, or a mobility state of one or more UEs in the plurality of UEs, or a combination thereof.

In some examples of the method and apparatus described above, a common DCI, or a MAC CE, or a RRC message, or a combination thereof.

A method of wireless communication at a base station is described. The method may include determining that a downlink communication to a UE is to be performed using a first transmit beam in a mmW wireless communication system, transmitting, using a second transmit beam that has a wider beam width than the first transmit beam, a reservation message providing an indication of the downlink communication, where the indication is conveyed in a common DCI, and performing the downlink communication to the UE using the first transmit beam.

Another apparatus for wireless communication at a base station is described. The apparatus may include a processor, memory in electronic communication with the processor, and instructions stored in the memory. The instructions may be operable to cause the processor to determine that a downlink communication to a UE is to be performed using a first transmit beam in a mmW wireless communication system, transmit, using a second transmit beam that has a wider beam width than the first transmit beam, a reservation message providing an indication of the downlink communication, where the indication is conveyed in a common DCI, and perform the downlink communication to the UE using the first transmit beam.

Some examples of the method and apparatus described above may further include processes, features, means, or instructions for identifying one or more neighboring UEs of the UE that may be configured for AUL communications. Some examples of the method and apparatus described above may further include processes, features, means, or instructions for quasi co-locating the common DCI with a DCI that the one or more neighboring UEs may be configured to monitor for the AUL communications.

In some examples of the method and apparatus described above, the second transmit beam may include a P1 transmit beam or a P2 transmit beam.

In some examples of the method and apparatus described above, the first transmit beam may include a P3 transmit beam.

DETAILED DESCRIPTION

Figure 1:
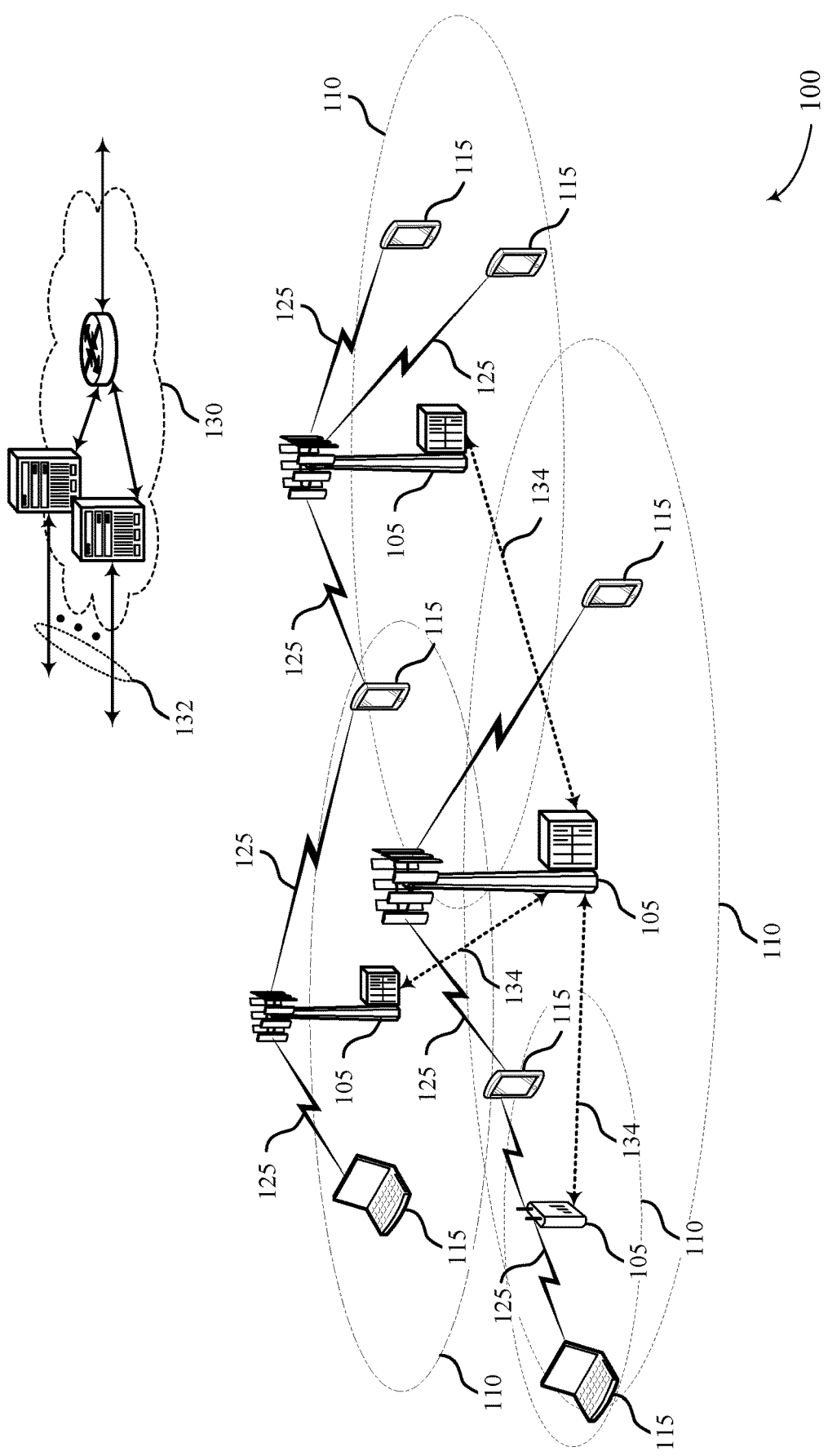
FIG. 1 illustrates an example of a system for wireless communication that supports group based scheduled and autonomous uplink coexistence in accordance with aspects of the present disclosure.

Some wireless communications systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from a number of candidate beams.

Some wireless communications systems may be configured with overlapping resources, at least to some degree, for autonomous uplink (AUL) transmissions and scheduled uplink (SUL) transmissions. When an AUL resource overlaps with an SUL resource, there is a potential the AUL transmission can start after the beginning of the SUL transmission. For example, if the AUL configured user equipment (UE) is not able to detect the SUL transmission, then its AUL transmission may cause interference with the SUL configured UE. However, if the AUL configured UE is close to the SUL configured UE, the listen-before-talk (LBT) procedure of the AUL configured UE would fail and the interference can be avoided. To overcome the potential for such interference, conventional wireless communications systems may simply avoid scheduling SUL transmissions using resources that overlap with AUL resources, and/or vice versa. However, these techniques may result in resource waste (such as when the LBT procedure for an SUL configured UE fails) and/or reduced AUL/SUL transmission opportunities.

Aspects of the disclosure are initially described in the context of a wireless communications system. Aspects of the present disclosure provide for implementation of a more efficient and comprehensive technique for coexistence between AUL configured UEs and SUL configured UEs. Generally, the described techniques provide for a base station to divide UEs within a cell into multiple groups, with each group being assigned a unique group identifier. The base station transmits a reservation signal indicating the set of all groups of UEs that are scheduled for communications in a slot or in a group of slots. Only the UEs in the indicated groups, which are configured for AUL transmissions, are permitted to contend for the channel during the scheduled slot(s). Thus, the base station may transmit an indication to each UE of one or more group identifiers that the UE is associated with. The base station may then transmit an indication of one or more group identifiers that are associated with scheduled communications during the time period (such as a slot or a group of slots). AUL configured UEs that belong to a group included in the one or more group identifiers associated with the scheduled communications may then contend for the channel and, if successful, perform AUL transmissions during the time period.

In a mmW network, the base station may avoid interference caused by AUL configured UEs by transmitting an indication that scheduled communications are to be performed, such as downlink transmissions. For example, the base station may determine that the scheduled communications are to be performed and transmit a reservation message that provides an indication of the scheduled communications. In some examples, the reservation message may be transmitted using a beam having a wider beam width (e.g., P1 or P2 beam) than a beam that will be used during the scheduled communications (e.g., P3 beam). Accordingly, AUL configured UEs that receive the reservation message may know not to contend for the medium during the scheduled communication period.

Aspects of the disclosure are further illustrated by and described with reference to apparatus diagrams, system diagrams, and flowcharts that relate to group based scheduled and autonomous uplink coexistence.

FIG. 1 illustrates an example of a wireless communications system 100 that supports group based scheduled and autonomous uplink coexistence in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some aspects, a UE 115 may receive, from a base station 105, a group identifier of the UE. The UE 115 may receive, from the base station 105, an indication of one or more group identifiers associated with scheduled communications with the base station 105 during a time period. The UE 115 may contend, based at least in part on the group identifier of the UE and the one or more group identifiers received from the base station, for access to a set of AUL resources during the time period. The UE 115 may perform, based at least in part on the contending, an AUL transmission to the base station 105 using the set of AUL resources.

In some aspects, a base station 105 may transmit, to a UE 115, a group identifier of the UE 115. The base station 105 may transmit an indication of one or more group identifiers associated with scheduled communications with the base station 105 during a time period, where the one or more group identifiers includes the group identifier of the UE 115. The base station 105 may receive an AUL transmission from the UE 115 over AUL resources during the time period based at least in part on the indication.

In some aspects, a base station 105 may determine that a scheduled communication with a UE 115 is to be performed using a first transmit beam in a mmW wireless communication system. The base station 105 may transmit, using a second transmit beam that has a wider beam width than the first transmit beam, a reservation message providing an indication of the scheduled communication, where the indication is conveyed in a common downlink control indicator (DCI). The base station 105 may perform the scheduled communication with the UE 115 using the first transmit beam.

Figure 2:
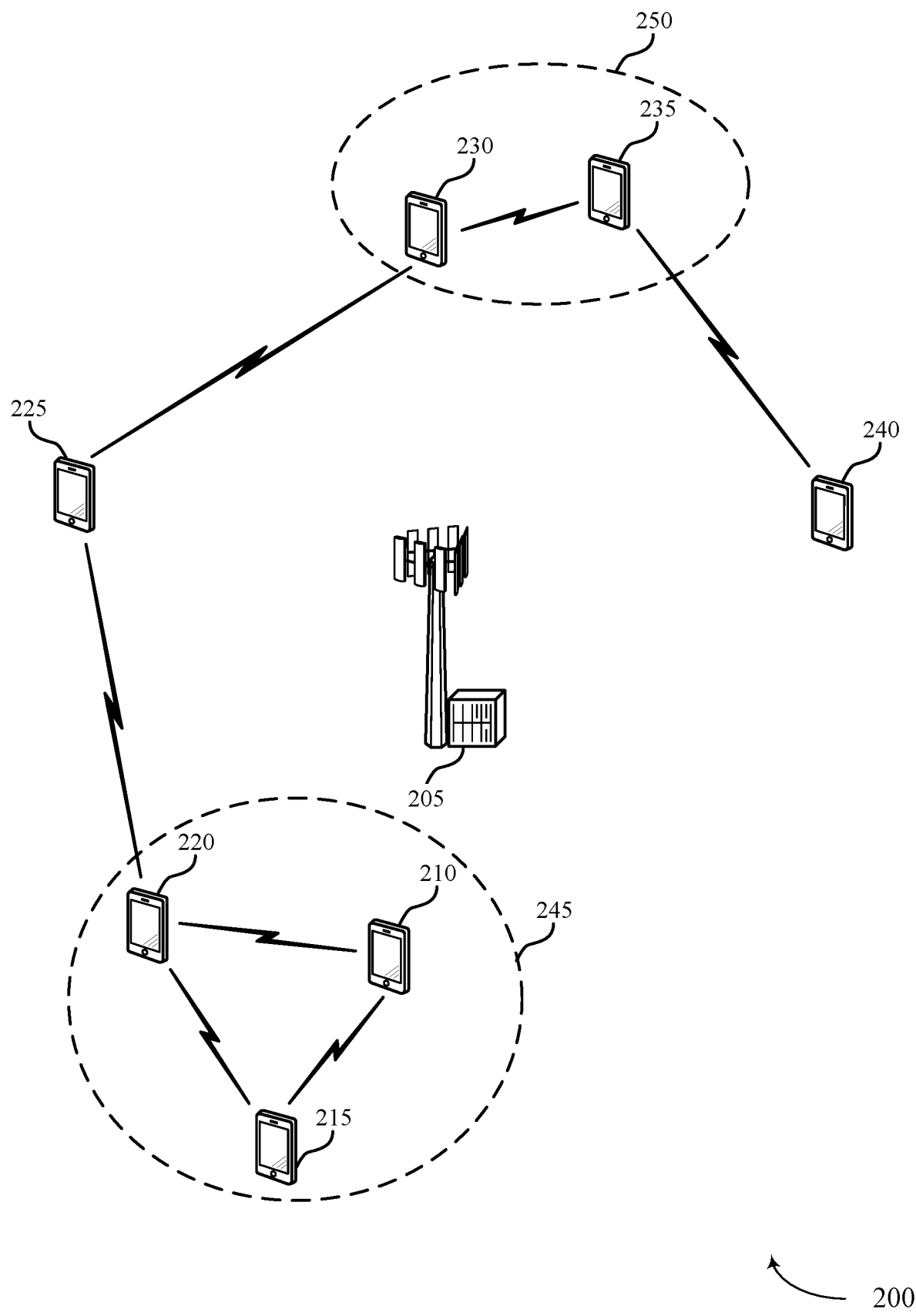
FIG. 2 illustrates an example of a wireless communications system that supports group based scheduled and autonomous uplink coexistence in accordance with aspects of the present disclosure.

FIG. 2 illustrates an example of a wireless communications system 200 that supports group based scheduled and autonomous uplink coexistence in accordance with aspects of the present disclosure. In some examples, wireless communications system 200 may implement aspects of wireless communications system 100. Wireless communications system 200 may include a base station 205 and UEs 210, 215, 220, 225, 230, 235, and 240, which may be examples of the corresponding device described herein. Broadly, wireless communications system 200 illustrates one example of base station 205 grouping UEs into one or more groups and scheduling communications for the UEs based on the grouping.

Generally, base station 205 may be in communication with each of UEs 210, 215, 220, 225, 230, 235, and 240. For example, each of the UEs 210, 215, 220, 225, 230, 235, and 240 may be located within the coverage area (such as a cell coverage area) a base station 205. In some aspects, one or more of the UEs 210, 215, 220, 225, 230, 235, and 240 may be configured for AUL transmissions and/or SUL transmissions. To avoid possible interference, base station 205 may group the UEs 210, 215, 220, 225, 230, 235, and 240 into one or more groups. Each group of the one or more UEs 210, 215, 220, 225, 230, 235, and 240 may then be scheduled for communications during a particular time period (such as slot(s)) based on the grouping.

In some aspects, the grouping may be based on feedback messages received from the UEs. For example, each UE 210, 215, 220, 225, 230, 235, or 240 may perform a measurement procedure to detect neighboring UEs 210, 215, 220, 225, 230, 235, and/or 240, such as a UE-to-UE measurement procedure. The measurement procedure may be an energy based measurement procedure based on reference signal transmissions (e.g., sounding reference symbol (SRS) transmissions) from the neighboring UEs 210, 215, 220, 225, 230, 235, and/or 240. Based upon the signal strength of the neighboring UEs, each UE 210, 215, 220, 225, 230, 235, or 240 may transmit a feedback signal or message to base station 205 that includes or otherwise conveys information associated with the neighboring UE(s) 210, 215, 220, 225, 230, 235, and/or 240. In some examples, the feedback information may simply identify the neighboring UEs 210, 215, 220, 225, 230, 235, and/or 240 that the reporting UE 210, 215, 220, 225, 230, 235, or 240 detected during the measurement procedure. In some examples, the feedback information may additionally or alternatively include measurement information associated with each detected neighboring UE 210, 215, 220, 225, 230, 235, and/or 240 (such as an indication of the received power level). In some examples, the reporting UE 210, 215, 220, 225, 230, 235, or 240 may perform preselection of the neighboring UEs 210, 215, 220, 225, 230, 235, and/or 240, e.g., only include an indication of neighboring UEs 210, 215, 220, 225, 230, 235, and/or 240 having a receive power level that satisfies a threshold. In some aspects, the measurement and reporting from the UEs 210, 215, 220, 225, 230, 235, and 240 within the coverage area of base station 205 may be performed according to a periodic schedule, aperiodically, based on changes (such as a change in a receive power level for one or more neighbor UEs), a mobility state, and the like.

In some aspects, the feedback message may include location based information for the reporting UE 210, 215, 220, 225, 230, 235, or 240 and, in some examples, for the neighboring UE(s) 210, 215, 220, 225, 230, 235,and/or 240.

The location information may include absolute location information, e.g., geographical coordinates, and/or relative location information, e.g., location with respect to the base station 205. The feedback message may include mobility information, such as a mobility state, a movement direction, a speed, and the like, for the reporting UE 210, 215, 220, 225, 230, 235, and/or 240 and, in some examples, for the neighboring UE(s) 210, 215, 220, 225, 230, 235, and/or 240.

Base station 205 may receive the feedback messages from the reporting UEs 210, 215, 220, 225, 230, 235, and 240 and then group the UEs 210, 215, 220, 225, 230, 235, and 240 into one or more groups based on the neighboring UEs 210, 215, 220, 225, 230, 235, and/or 240. In some aspects, this may include grouping UEs 210, 215, 220, 225, 230, 235, and 240 within a particular group based on the UEs 210, 215, 220, 225, 230, 235, and 240 being within communication range of each other. For example and as is indicated in FIG. 2, base station 205 may group UEs 210, 215, and 220 into a first group 245 based on these UEs 210, 215, and 220 being proximate to each other. Similarly, base station 205 may group UEs 230 and 235 into a second group 250 based on these UEs 230 and 235 being proximate to each other. UEs 225 and 240 may each be grouped into a single UE group, e.g. a group of UEs consisting of only one UE, based on there being no neighboring UEs located proximate to UEs 225 and/or 240.

Generally, the UEs 210, 215, 220, 225, 230, 235, and 240 being proximate to each may refer to the UEs 210, 215, 220, 225, 230, 235, and 240 being within communication range of each other, based on the UEs 210, 215, 220, 225, 230, 235, and 240 being physically located within defined range of each other, and the like. For example and as is illustrated in FIG. 2, UEs 210, 215, and 220 may be considered proximate to each other in that each UE is within a communication range of the other UEs. That is, UE 210 is within communication range of UEs 215 and 220, UE 215 is within communication range of UEs 210 and 220, and so on. UE 220 may be in communication range of UE 225, but UE 225 may not be included in the first group 245 because it is not in communication range of UEs 210 and 215. Similarly, UEs 230 and 235 may be considered proximate to each other in that each UE is within a communication range of the other UE. That is, UE 230 is within communication range of UE 235, and vice versa. UE 230 may be in communication range of UE 225, but UE 225 may not be included in the second group 250 because it is not in communication range of UE 235. UE 240 may be in communication range of UE 235, but UE 240 may not be included in the second group 250 because it is not in communication range of UE 230.

Thus, base station 205 may group the UEs 210, 215, 220, 225, 230, 235, and 240 into one or more groups and transmit a signal to the UEs 210, 215, 220, 225, 230, 235, and 240 indicating which group(s) the UE(s) 210, 215, 220, 225, 230, 235, and 240 belong to, e.g., the group identifier(s) of the UE(s) 210, 215, 220, 225, 230, 235, and 240. The indication of the group identifier(s) for the UE(s) 210, 215, 220, 225, 230, 235, and 240 may be included or otherwise conveyed in a DCI, a medium access control (MAC) control element (CE), an RRC message, a broadcast message, and the like. In some cases in which UEs 210, 215, 220, 225, 230, 235, and 240 are being FDMed, the indication may carry multiple bits to indicate whether the group identifier (ID) is determined per a given sub-band or bandwidth part. In some cases, a common DCI may indicate the group ID which the base station 105 intends to schedule in a given slot. In some cases, the base station 105 may use different group IDs for UE data and control signaling (e.g., UCI on PUCCH).

Base station 205 may then schedule communications for certain UEs 210, 215, 220, 225, 230, 235, and/or 240 based at least in part on the grouping. For example, base station 205 may schedule AUL transmission for UEs 210, 215, 220, 225, 230, 235, and/or 240 within a group that also includes UEs 210, 215, 220, 225, 230, 235, and/or 240 performing SUL transmissions. As one example, base station 205 may schedule the first group 245 for communications during a time period (e.g., a slot) in which UE 215 is scheduled for SUL transmissions and UEs 210 and/or 220 are scheduled for AUL transmissions. Base station 205 may transmit a signal to UEs 210, 215, 220, 225, 230, 235, and 240 within its coverage area that provides an indication of which group identifiers are associated with the scheduled communications during the time period, e.g., during the slot. The indication may be included or otherwise conveyed in a DCI.

In the example where the first group 245 is scheduled for communications during the slot, UEs 225, 230, 235, 240, may receive the indication and determine that they will not be performing communications during slot. UE 215 may receive the indication and determine that it will be performing SUL transmissions during that slot. UEs 210 and/or 220 may receive the indication and determine that they are configured to perform AUL transmissions during the slot. Thus, UEs 210 and/or 220 may contend for access to AUL resources during the slot based on their group identifier and the indication of which groups have been scheduled for communications during the slot. Contention for access to the AUL resources may include UEs 210 and/or 220 performing an LBT procedure and, if successful, performing the AUL transmission using the AUL resources. If, however, UEs 210 and/or 220 detect SUL transmissions from UE 215 during the LBT procedure, they may perform a backoff procedure and wait to perform the AUL transmissions during a later slot.

In some aspects, there may be overlapping (or at least partially overlapping) resource for AUL and SUL transmissions. The resources for the AUL transmissions may, in some examples, be associated with a higher priority level than the resources for the SUL transmissions. In one non-limiting example, this may include the starting position (e.g., the starting symbol) of the resources for the AUL transmissions being before the starting position of the resources for the SUL transmissions. This may provide a mechanism where the SUL transmission can occur only when the AUL transmissions have not occurred, e.g., when no AUL configured UE accesses the resources for the AUL transmission.

In some aspects, an SUL configured UE 210, 215, 220, 225, 230, 235, or 240 may be allocated resources that are also allocated for AUL transmissions, e.g., resources that are overlapping or partially overlapping. The SUL configured UE 210, 215, 220, 225, 230, 235, or 240 may use symbols around the AUL resource (including leaving some symbols around the AUL allocation for LBT gaps). When the SUL configured UE 210, 215, 220, 225, 230, 235, or 240 does not detect any AUL transmissions, the SUL configured UE 210, 215, 220, 225, 230, 235, or 240 can start transmitting on the AUL symbols as well.

In some aspects, the SUL configured UE 210, 215, 220, 225, 230, 235, or 240 may be allocated a conditional grant for resources that overlap (or partially overlaps) with an AUL resource, but which begins after the start of the AUL resource. Even in the scenario where no LBT procedure is required, the SUL configured UE 210, 215, 220, 225, 230, 235, or 240 may use the AUL resource after a successful LBT procedure, e.g., performed to listen for AUL transmissions on the overlapping resources. Similarly, an AUL configured UE 210, 215, 220, 225, 230, 235, or 240 may also perform an LBT procedure, even though it is not a requirement, in order to detect any ongoing SUL transmissions and avoid interference. In some aspects, this may support efficient usage of AUL resources by SUL configured UEs 210, 215, 220, 225, 230, 235, and/or 240.

Figure 3:
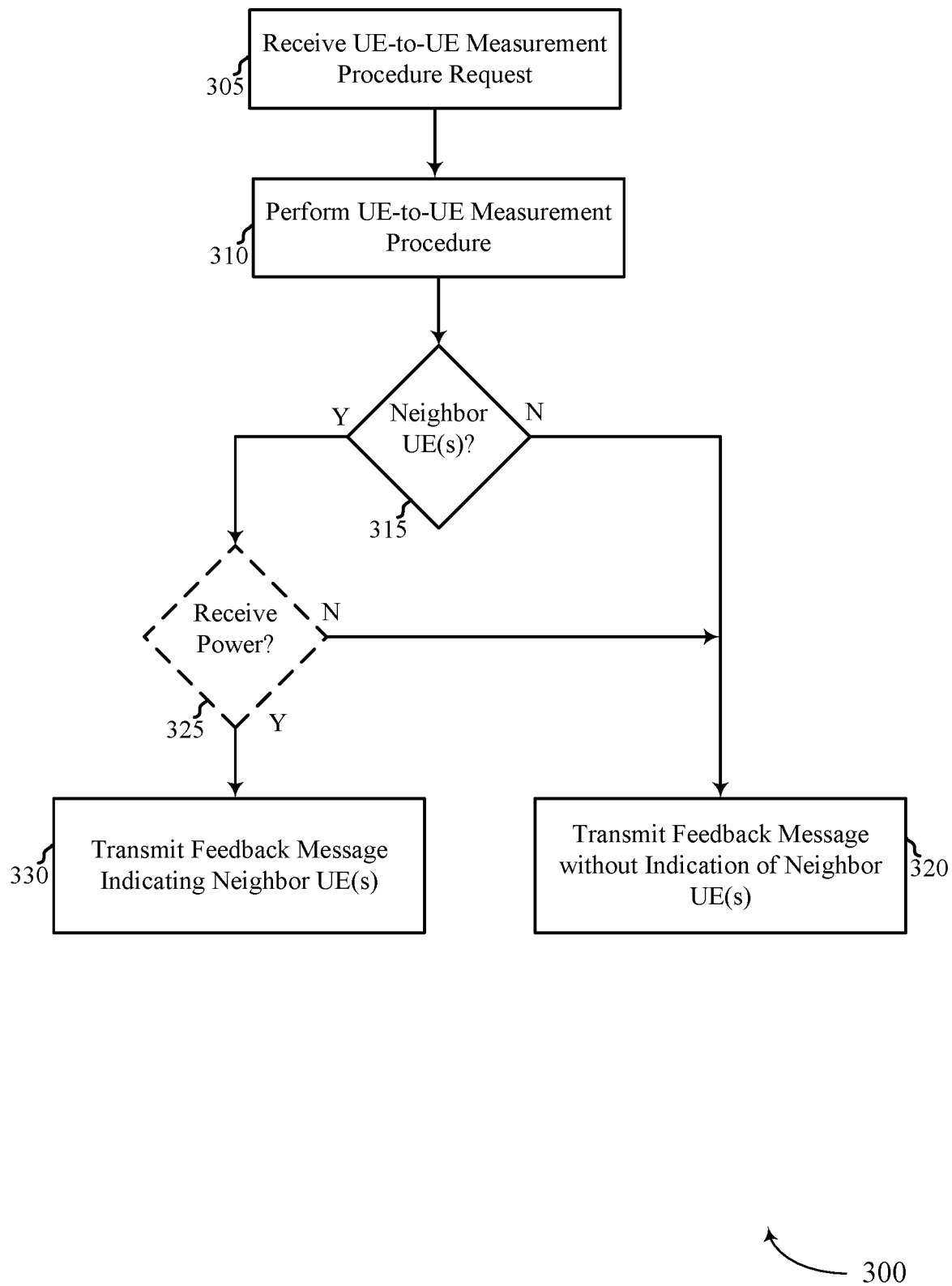
FIG. 3 illustrates an example of a flowchart that supports group based scheduled and autonomous uplink coexistence in accordance with aspects of the present disclosure.

FIG. 3 illustrates an example of a flowchart 300 that supports group based scheduled and autonomous uplink coexistence in accordance with aspects of the present disclosure. In some examples, flowchart 300 may implement aspects of wireless communications systems 100 and/or 200. Aspects of flowchart 300 may be implemented by a UE 115, which may be an example of the corresponding device described herein. Generally, flowchart 300 illustrates one example of a UE 115 providing information in a feedback message that can be used for grouping the UE 115 in the one or more groups.

At 305, the UE 115 may receive a signal from a base station 105 that includes or otherwise conveys an indication of a request for the UE 115 to perform a UE-to-UE measurement procedure. In some examples, the UE-to-UE measurement procedure may be an NR cross-link interference (CLI) framework procedure. The UE 115 may receive the measurement request from the base station 105 according to a periodic schedule, aperiodically, based on a changed condition, and the like.

At 310, the UE 115 may perform a UE-to-UE measurement procedure. In some aspects, this may include the UE 115 monitoring for transmissions from the neighboring UEs 115 during the measurement procedure, such as SRS transmissions scheduled by the base station 105. Based on the UE 115 detecting any transmissions, the UE 115 may also determine the signal strength or power level for the received signal(s). In some aspects, the UE-to-UE measurement procedure may be an energy based detection procedure.

At 315, the UE 115 may determine whether or not it has any neighboring UEs 115. For example, this determination may be based on whether the UE 115 detected any transmissions from neighboring UEs 115 during the UE-to-UE measurement procedure. In some aspects, this may be determined based on location information associated with the UE 115 and any neighboring UEs 115.

If the UE 115 determines that there are no neighboring UEs 115, at 320 the UE 115 may transmit a feedback message to the base station 105 including or otherwise conveying an indication that there are no neighboring UEs 115 for the reporting UE 115.

If the UE 115 determines that there are neighboring UEs 115, at 325 the UE 115 may optionally determine whether the neighboring UEs 115 have a receive power level that is above a threshold. For example, the UE 115 may determine, for each detected neighboring UE 115, what the receive power level is for the SRS transmission and then compare the receive power level to a threshold. If the receive power level for at least one neighboring UE 115 satisfies the threshold, at 330 the UE 115 may transmit a feedback message to the base station 105 that includes an indication of the neighboring UE 115. If the receive power level for all of the neighboring UE 115 does not satisfy the threshold, at 320 the UE 115 may transmit the feedback message to the base station that includes an indication that there are no neighboring UEs 115 for the reporting UE 115. However, as discussed above the features at 325 may be optional and, when not implemented, at 330 the UE 115 may transmit the feedback message to the base station 105 that includes an indication of neighboring UEs 115 having any receive power level (e.g., identifies the neighboring UEs 115 and, in some examples, provides an indication of their associated receive power level).

Thus, UEs 115 in close range to each other may be included as part of a group. The base station 105 may configure the UE-to-UE measurements to enable grouping UEs 115 (e.g., using the NR CLI framework). Each UE 115 may transmit SRS (one or more times, or periodically) to enable other UEs 115 to determine which set of UEs 115 hear each other, e.g., are within communication range of each other. The scrambling configuration and/or resources for SRS may be indicated by the base station 105 to all of the UEs 115. In some examples, the transmit power for SRS may be proportional to (e.g., equal to) to the power used for PUSCH transmissions. When one UE 115 sounds (e.g., transmits SRS), all the other UEs 115 are silent so that they can hear the SRS of neighboring UE(s) 115. In some examples and after the sounding procedure, each UE 115 may determine whether there are any neighboring UE(s) 115 and, if so, report this to the base station in a feedback message. In some examples, this may be based on the receive power level of detected SRS(s) being compared to a configured threshold. This UE-to-UE measurement procedure may be repeated to enable accurate measurements, to update the UE grouping, and/or to overcome LBT failure at some of the UEs 115. The base station 105 may use the reports (e.g., the feedback messages) from all the UEs 115 to divide the UEs 115 into groups. If the pathloss for a UE 115 changes beyond a threshold and/or if the UE 115 is mobile, the base station may trigger SRS sounding again to enable the UE 115 to be placed in a new group, if needed, e.g., to update the UE grouping.

In some aspects, transmit power control and resource block allocation may be considered. For example, in LTE, LAA and multi-fire (MF), the transmit power may scale as a function of the resource block allocation (e.g., in order to maintain constant power spectral density (PSD)). However, this approach may be problematic in a shared or unlicensed spectrum as the UE transmit power scales down with a smaller resource block allocation. This may result in a reduced LBT blocking range for that transmission. Aspects of the described techniques may support the transmit power from each UE 115 being relatively constant irrespective of the resource block allocation, e.g., a constant SRS transmission power. Thus, in some examples each UE 115 may also report the set of neighboring UE(s) 115 that it hears and also include the received energy level (e.g., the SRS-RSRP and SRS-RSSI in the CLI framework) in the feedback message. Based on this information, the base station 105 may construct hearing graphs based on multiple thresholds and then decide on the UE grouping based on its scheduling strategy. Alternatively, the base station 105 can configure each UE 115 with multiple group identifiers (e.g., depending on the threshold it used to determine the interference graphs). The base station 105 can indicate the group identifier (ID) applicable in common signaling (e.g., in a common DCI).

Figure 4:
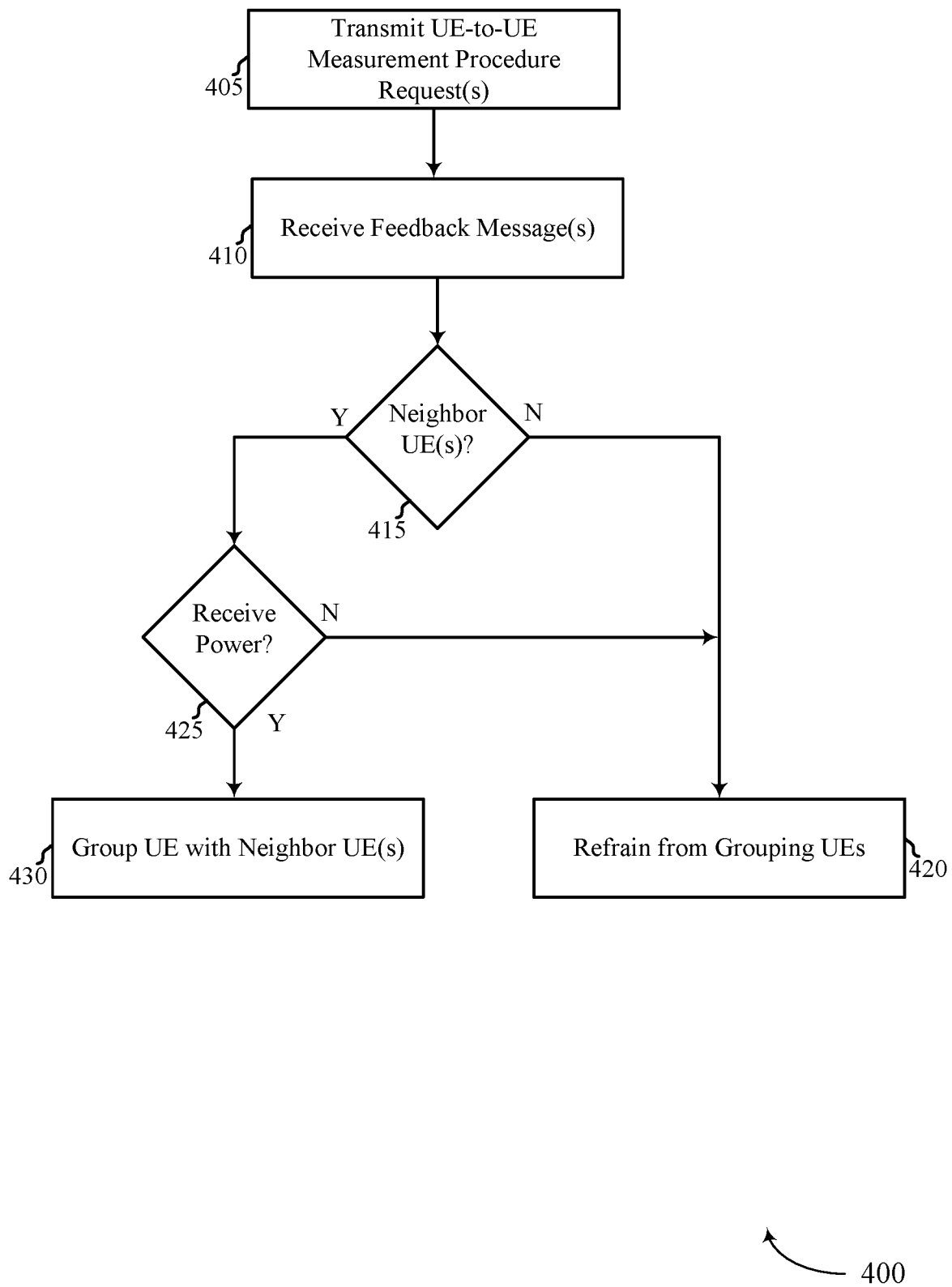
FIG. 4 illustrates an example of a flowchart that supports group based scheduled and autonomous uplink coexistence in accordance with aspects of the present disclosure.

FIG. 4 illustrates an example of a flowchart 400 that supports group based scheduled and autonomous uplink coexistence in accordance with aspects of the present disclosure. In some examples, flowchart 400 may implement aspects of wireless communications systems 100/200 and/or flowchart 300. Aspects of flowchart 400 may be implemented by a base station 105, which may be an example of the corresponding device described herein. Generally, flowchart 400 illustrates one example of a base station grouping UEs in the one or more groups based on feedback message signaling.

At 405, the base station 105 may transmit a signal to the UEs 115 within its coverage area that includes or otherwise conveys an indication of a request for the UEs 115 to perform a UE-to-UE measurement procedure. In some examples, the UE-to-UE measurement procedure may be an NR CLI framework procedure. The base station 105 may transmit the measurement request according to a periodic schedule, aperiodically, based on a changed condition, and the like.

At 410, the base station 105 may receive feedback message(s) from UE(s) 115 within its coverage area. For example, each UE 115 may perform the UE-to-UE measurement procedure as is described above and respond by transmitting feedback messages to the base station 105.

At 415, the base station 105 may determine, for each reporting UE 115, whether or not that UE 115 has any neighboring UEs 115. For example, this determination may be based on the feedback message from the reporting UE 115 indicating whether the UE 115 detected any transmissions from neighboring UEs 115 during the UE-to-UE measurement procedure. In some aspects, this may be determined based on location information associated with the reporting UE 115 and any neighboring UEs 115.

If the base station 105 determines that there are no neighboring UEs 115 for the reporting UEs 115, at 420 the base station 105 may refrain from grouping the UEs 115 into the one or more groups.

If the base station 105 determines that there are neighboring UEs 115, at 425 the base station 105 may determine, for each reporting UE 115, whether the neighboring UEs 115 have a receive power level that is above a threshold. For example, the base station may determine, for each reporting UE 115, what the receive power level was for the SRS transmission and then compare the receive power level to a threshold. If the receive power level for at least one neighboring UE 115 satisfies the threshold, at 430 the base station may group the reporting UE 115 and the neighboring UE(s) 115 into a group. If the receive power level for all of the neighboring UE 115 does not satisfy the threshold, at 420 the base station 105 may not group the reporting UE 115 into the one or more groups of UEs 115. The base station 105 may transmit a signal to UEs 115 indicating which group(s) that the UE 115 belongs to and then schedule communications for UEs 115 based at least in part on the grouping.

One example of the base station 105 grouping the UEs 115 into one or more groups may be based on a minimal clique cover. The base station 105 may construct a graph of the set of UEs 115 that hear each other. The minimal clique cover of that graph may provide a set of UEs 115 which can all hear each other, e.g., are within communication range of each other, are proximate to each other, and the like. It is to be understood that the described grouping techniques are not limited to a minimal clique cover, and that other grouping techniques may be used. A clique may be a set of UEs 115 (group of UEs) that hear each other mutually. If UEs 115 in group one can block each other, the SUL transmissions of UEs 115 in group one may block AUL transmissions of UEs 115 in that group. In some aspects and due to the nature of hearing graphs, the base station 105 may divide the UEs 115 into multiple groups.

Figure 5:
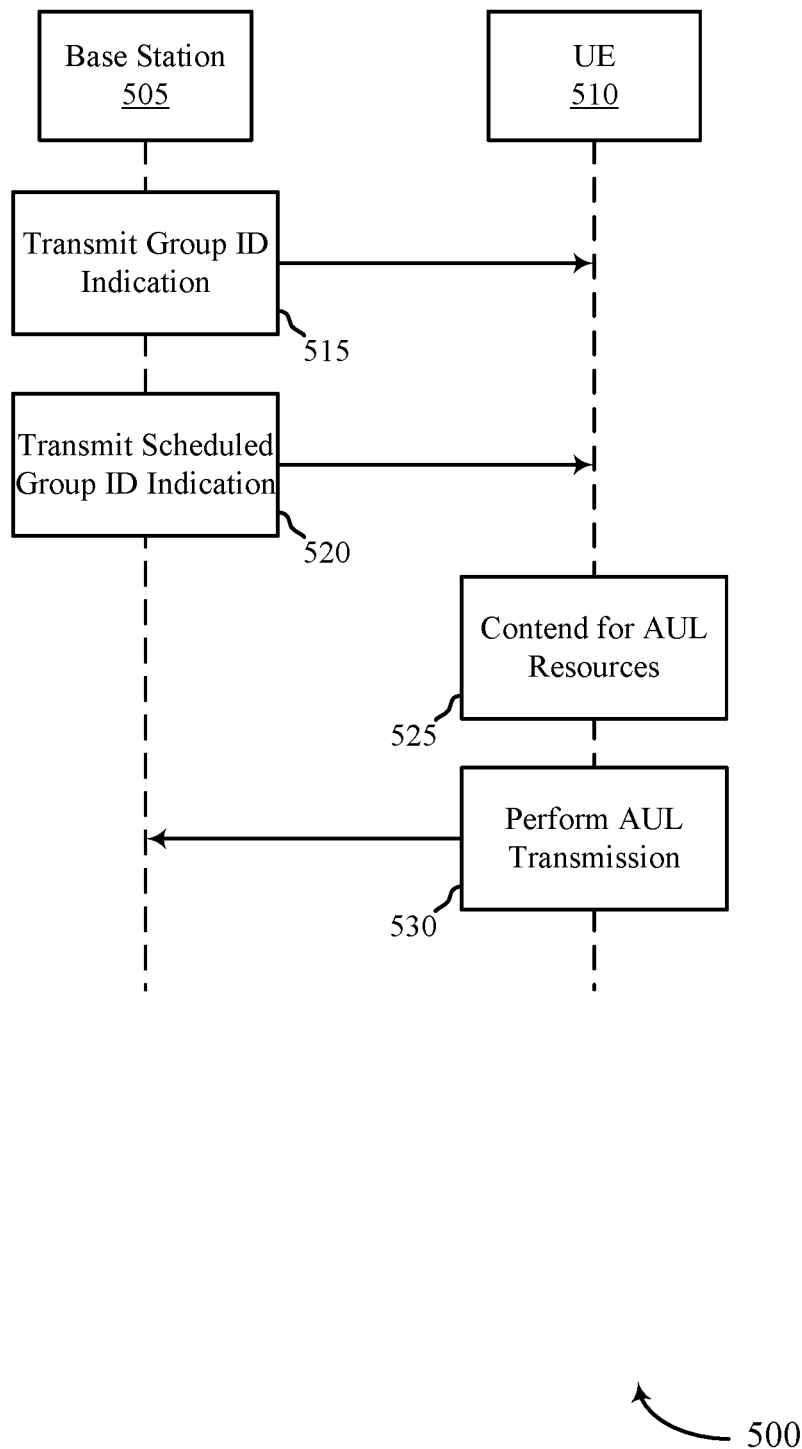
FIG. 5 illustrates an example of a process that supports group based scheduled and autonomous uplink coexistence in accordance with aspects of the present disclosure.

FIG. 5 illustrates an example of a process 500 that supports group based scheduled and autonomous uplink coexistence in accordance with aspects of the present disclosure. In some examples, process 500 may implement aspects of wireless communications systems 100/200 and/or flowcharts 300/400. Process 500 may include a base station 505 and the UE 510, which may be examples of the corresponding devices described herein.

At 515, base station 505 may transmit (and UE 510 may receive) a group identifier of the UE 510. In some aspects, base station 505 may transmit the indication of a group identifier of the UE 510 in a common DCI, in MAC CE, in an RRC message, and the like.

In some aspects, the group identifier of the UE 510 may be based on the feedback message. For example, UE 510 may perform one or more instances of a UE-to-UE measurement procedure and, based on the procedure, transmit a feedback message to base station 505. During the procedure, UE 510 may determine that one or more neighboring UEs are associated with receive power levels that are above a threshold value and configure the feedback message to indicate an identifier of the one or more neighboring UEs. In some aspects, the feedback message may include or otherwise provide an indication of the receive power level for the one or more neighboring UEs. In some aspects, the UE-to-UE measurement procedure and feedback message reporting may be repeated according to a periodic schedule, an aperiodic schedule, a change in the receive power levels for at least one of the neighboring UEs that is above a threshold, a mobility state of the UE 510, and the like.

At 520, base station 505 may transmit (and UE 510 may receive) an indication of one or more group identifiers that are associated with scheduled communications with the base station 505 during a time period, e.g., during a slot. Generally, the indicated one or more group identifiers may be scheduled to perform AUL and/or SUL transmissions during that time period. In some aspects, the indication of the one or more group identifiers may be provided in a DCI, such as a common DCI.

At 525, UE 510 may contend for AUL resources during the time period. UE 510 may contend for the AUL resources based, at least in some aspects, on the group identifier of the UE and/or the indication of the one or more group identifiers that are scheduled for communications. In some aspects, this may include UE 510 performing an LBT procedure to contend for the AUL resources. The LBT procedure may be considered successful (e.g., in that the UE 510 secures the AUL resources) based on the UE 510 not detecting an energy level during the LBT procedure, such as energy associated with an SUL transmission from the neighboring UEs. If the UE 510 detects an energy level during the LBT procedure, the UE 510 may refrain from performing an AUL transmission (not shown) and, instead delay the AUL transmission to a later time period.

At 530, UE 510 may perform an AUL transmission to base station 505 using the set of AUL resources. In some aspects, UE 510 may perform the AUL transmission based on the results of contending for the AUL resources, e.g., based on the LBT procedure being successful.

Figure 6:
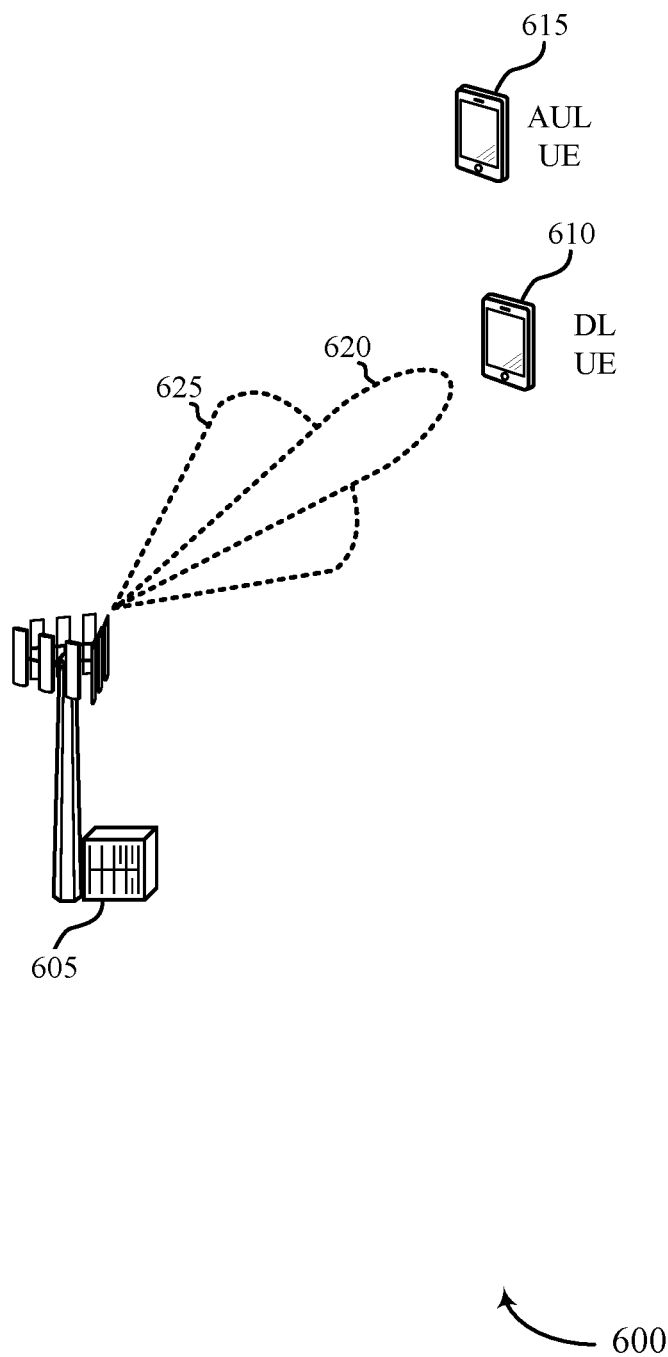
FIG. 6 illustrates an example of a wireless communications system that supports group based scheduled and autonomous uplink coexistence in accordance with aspects of the present disclosure.

FIG. 6 illustrates an example of a wireless communications system 600 that supports group based scheduled and autonomous uplink coexistence in accordance with aspects of the present disclosure. In some examples, wireless communications system 600 may implement aspects of wireless communications systems 100/200, flowcharts 300/400, and/or process 500. Wireless communications system 600 may include a base station 605 and UEs 610 and 615, which may be examples of the corresponding devices described herein. In some aspects, wireless communications system 600 may be a mmW wireless communication system.

Generally, wireless communications system 600 illustrates one example of how a base station can avoid interference to downlink transmissions caused by AUL configured UEs. For example, base station 605 may determine that it has downlink communications to transmit to UE 610. The downlink communications may be transmitted to UE 610 using a first transmit beam 620. UE 615, however, may be configured to perform AUL transmissions to base station 605.

Accordingly, base station 605 may use a second transmit beam 625 to transmit a reservation message that includes or otherwise provides an indication of the downlink communications to be performed to UE 610 during a time period. In some aspects, the indication may be conveyed in a common DCI. Base station 605 may determine or otherwise identify that UE 610 as one or more neighboring UEs that are configured for AUL transmissions, e.g. such as UE 615. Base station 605 may therefore quasi-co-locate (QCL) the common DCI with the DCI that the neighboring UEs that are configured for AUL transmissions will be monitoring.

Accordingly, UE 615 may receive the reservation message and determine the base station 605 will be performing downlink transmissions to UE 610 during the time period. In response, UE 615 may refrain from contending for the medium in order to perform AUL transmissions during the time period. Instead, base station 605 may perform the downlink transmissions to UE 610 using the first transmit beam 620.

Generally, the second transmit beam 625 may have a wider beam width than the first transmit beam 620. In some aspects, the first transmit beam 620 may be a P3 transmit beam and the second transmit beam 625 may be a P1 or P2 transmit beam.

Thus, aspects of the described techniques may provide a solution to certain problems that may exist in mmW networks with sufficient beam directionality. One example problem relates to UE-to-UE discovery, which may not be reliable due to the directionality of transmission. An LBT procedure performed by neighboring UEs (such as UE 615) may not be blocked due to an uplink transmission from a UE (such as UE 610) due to the nature of the beam based transmission. The base station 605 may schedule communications using a scheduling request based transmission without any perceivable impact on user experience. Another example problem relates to cross-link interference. The base station 605 may perform downlink transmission to UE 610 using configured AUL resources for UE 615. This may result in cross-link interference at UE 610.

To address these and other problems, aspects of the described techniques may include base station 605 signaling to UEs on a wide beam (P1 beam) or on multiple (P2) beams that it will schedule a UE for downlink communications (e.g., UE 610). UEs that receive this signaling (e.g., UE 615) may backoff from performing AUL transmissions when the downlink communications are scheduled. The signaling may use a QCL DCI with the beam that the UE 615 is required to monitor before transmitting on configured AUL resources.

Figure 7:
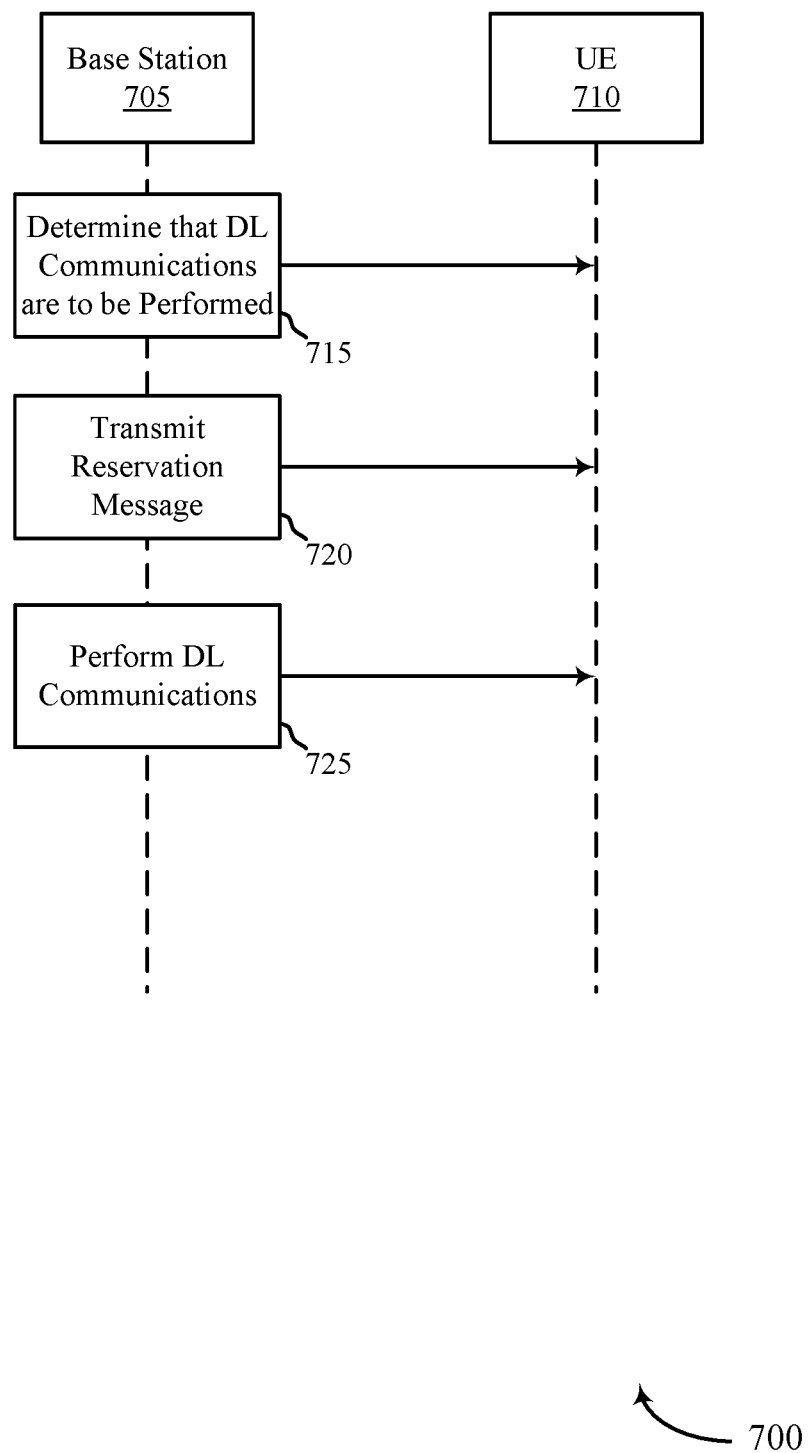
FIG. 7 illustrates an example of a process that supports group based scheduled and autonomous uplink coexistence in accordance with aspects of the present disclosure.

FIG. 7 illustrates an example of a process 700 that supports group based scheduled and autonomous uplink coexistence in accordance with aspects of the present disclosure. In some examples, process 700 may implement aspects of wireless communications systems 100/200/600, flowcharts 300/400, and/or process 500. Process 700 may include a base station 705 and a UE 710, which may be examples of the corresponding devices described herein.

At 715, base station 705 may determine that downlink communications are to be performed to UE 710. The downlink communications may be performed using a first transmit beam in a mmW wireless communication system.

At 720, base station 705 may transmit a reservation message that provides an indication of the downlink communications. The reservation message may be transmitted in a common DCI. The reservation message may be transmitted using a second transmit beam that has a beam width that is wider than the first transmit beam. In some aspects, the reservation message may be provided in order for AUL configured UEs that are located proximate to UE 710 to refrain from contending for AUL resources during the time period.

In some aspects, base station 705 may identify that there are one or more neighboring UEs located near UE 710 that are configured for AUL communications. Based on this determination, base station 705 may QCL the common DCI with a DCI that the one or more neighboring UEs are configured to monitor for the AUL communications.

At 725, base station 705 might perform the downlink communications to UE 710 using the first transmit beam. In some aspects, the first transmit beam may be a P3 transmit beam and the second transmit beam may be a P1 or P2 transmit beam.

Figure 8:
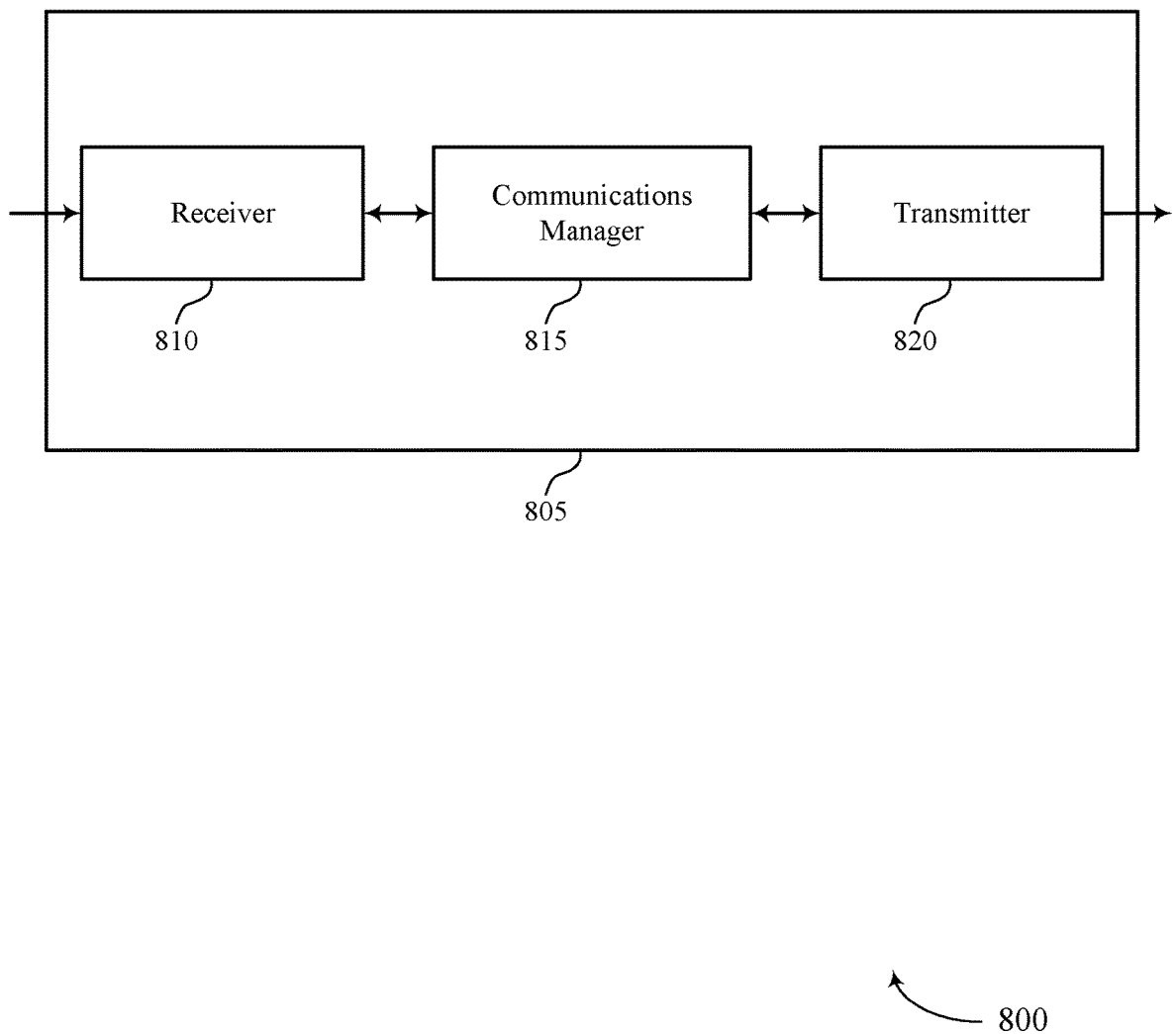
FIGS. 8 through 10 show block diagrams of a device that supports group based scheduled and autonomous uplink coexistence in accordance with aspects of the present disclosure.

FIG. 8 shows a block diagram 800 of a UE 805 that supports group based scheduled and autonomous uplink coexistence in accordance with aspects of the present disclosure. UE 805 may be an example of aspects of a UE 115 as described herein. UE 805 may include receiver 810, communications manager 815, and transmitter 820. UE 805 may also include a processor. Each of these components may be in communication with one another (e.g., via one or more buses).

Receiver 810 may receive information such as packets, user data, or control information associated with various information channels (e.g., control channels, data channels, and information related to group based scheduled and autonomous uplink coexistence, etc.). Information may be passed on to other components of the device 805. The receiver 810 may be an example of aspects of the transceiver 1120 described with reference to FIG. 11. The receiver 810 may utilize a single antenna or a set of antennas.

Communications manager 815 may be an example of aspects of the communications manager 1110 described with reference to FIG. 11.

Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 815 may receive, from a base station, a group identifier of the UE, receive, from the base station, an indication of one or more group identifiers associated with scheduled communications with the base station during a time period, contend, based on the group identifier of the UE and the one or more group identifiers received from the base station, for access to a set of AUL resources during the time period, and perform, based on the contending, an AUL transmission to the base station using the set of autonomous uplink resources.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
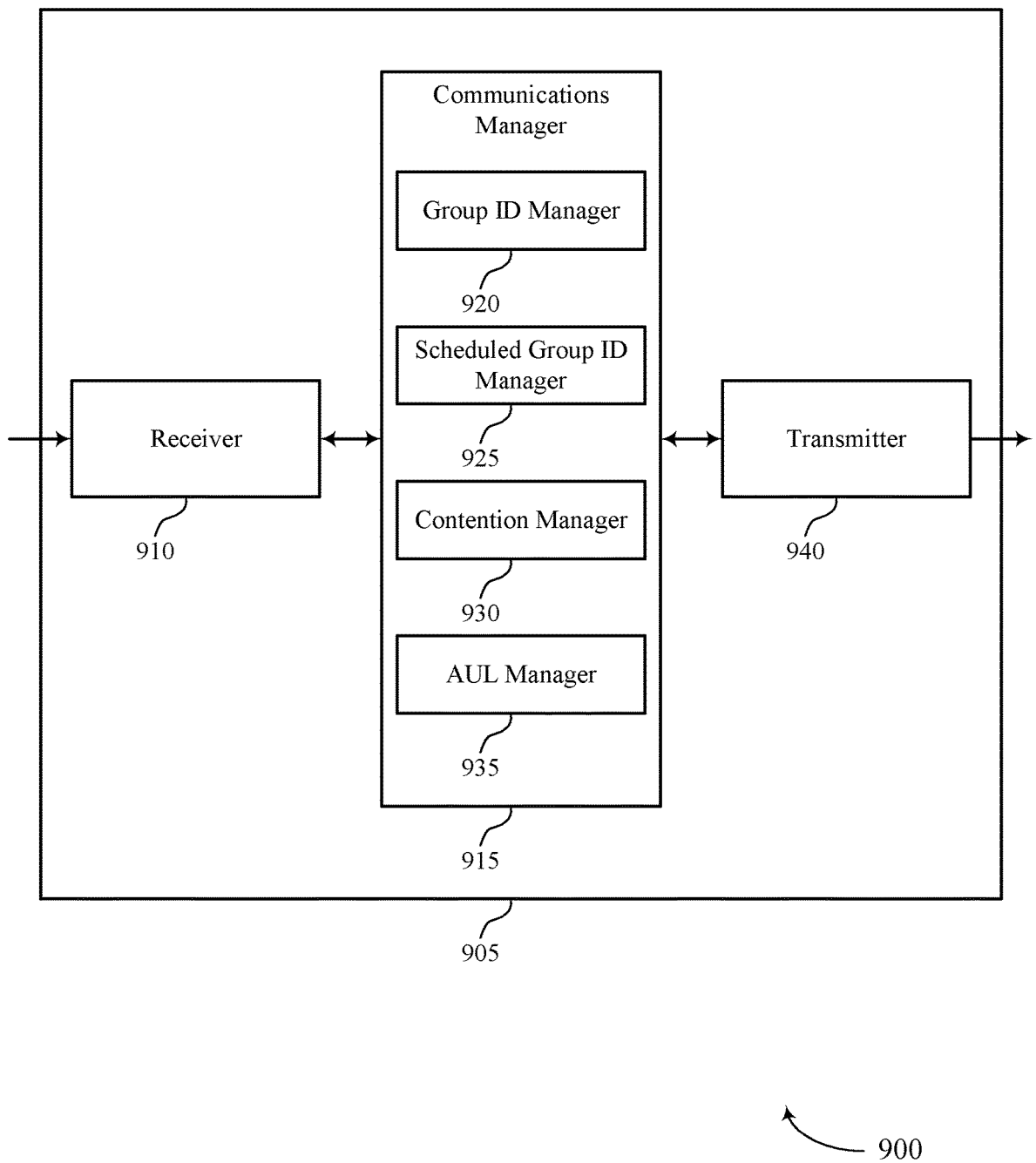

FIG. 9 shows a block diagram 900 of a UE 905 that supports group based scheduled and autonomous uplink coexistence in accordance with aspects of the present disclosure. UE 905 may be an example of aspects of a UE 805 or a UE 115 as described with reference to FIGS. 1 and 805. UE 905 may include receiver 910, communications manager 915, and transmitter 940. UE 905 may also include a processor. Each of these components may be in communication with one another (e.g., via one or more buses).

Receiver 910 may receive information such as packets, user data, or control information associated with various information channels (e.g., control channels, data channels, and information related to group based scheduled and autonomous uplink coexistence, etc.). Information may be passed on to other components of the device 905. The receiver 910 may be an example of aspects of the transceiver 1120 described with reference to FIG. 11. The receiver 910 may utilize a single antenna or a set of antennas.

Communications manager 915 may be an example of aspects of the communications manager 1110 described with reference to FIG. 11.

Communications manager 915 may also include group ID manager 920, scheduled group ID manager 925, contention manager 930, and AUL manager 935.

Group ID manager 920 may receive, from a base station, a group identifier of the UE.

Scheduled group ID manager 925 may receive, from the base station, an indication of one or more group identifiers associated with scheduled communications with the base station during a time period.

Contention manager 930 may contend, based on the group identifier of the UE and the one or more group identifiers received from the base station, for access to a set of AUL resources during the time period.

AUL manager 935 may perform, based on the contending, an AUL transmission to the base station using the set of autonomous uplink resources.

Transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
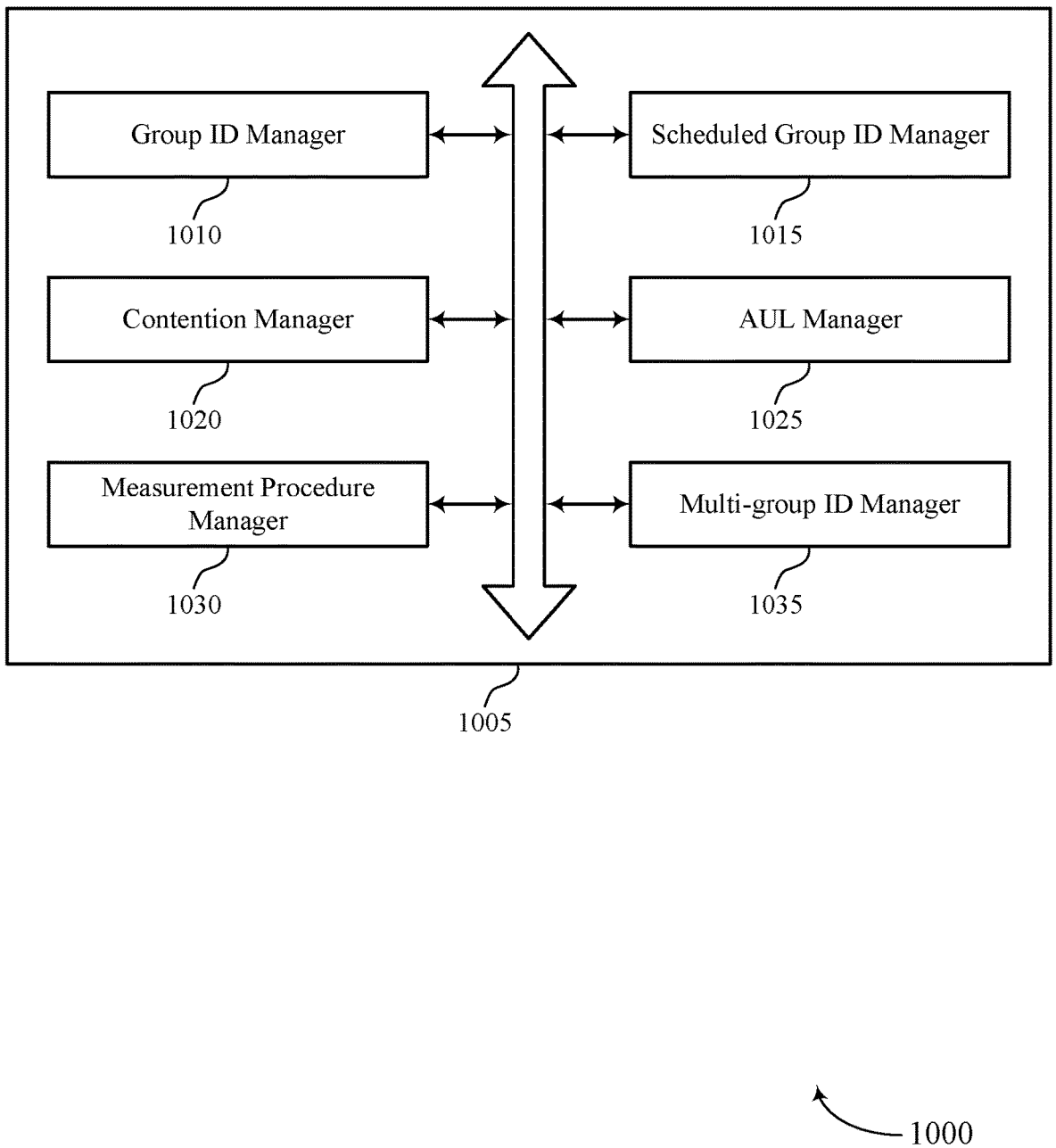

FIG. 10 shows a block diagram 1000 of a communications manager 1005 that supports group based scheduled and autonomous uplink coexistence in accordance with aspects of the present disclosure. The communications manager 1005 may be an example of aspects of a communications manager 815, a communications manager 915, or a communications manager 1110 described with reference to FIGS. 8, 9, and 11. The communications manager 1005 may include group ID manager 1010, scheduled group ID manager 1015, contention manager 1020, AUL manager 1025, measurement procedure manager 1030, and multi-group ID manager 1035. Each of these modules may communicate, directly or indirectly, with one another (e.g., via one or more buses).

Group ID manager 1010 may receive, from a base station 105, a group identifier of the UE 115. In some cases, a common DCI, or a MAC CE, or a RRC message, or a combination thereof.

Scheduled group ID manager 1015 may receive, from the base station 105, an indication of one or more group identifiers associated with scheduled communications with the base station 105 during a time period. In some cases, the indication of the one or more group identifiers is received in a common DCI.

Contention manager 1020 may contend, based on the group identifier of the UE 115 and the one or more group identifiers received from the base station 105, for access to a set of AUL resources during the time period.

AUL manager 1025 may perform, based on the contending, an AUL transmission to the base station using the set of autonomous uplink resources.

Measurement procedure manager 1030 may perform one or more instances of a UE-to-UE measurement procedure. Measurement procedure manager 1030 may transmit a feedback message to the base station 105 based on the UE-to-UE measurement procedure, where the group identifier of the UE 115 is based on the feedback message. Measurement procedure manager 1030 may determine, during the UE-to-UE measurement procedure, that one or more neighboring UEs 115 are associated with receive power levels above a threshold value. Measurement procedure manager 1030 may configure the feedback message to indicate an identifier for the one or more neighboring UEs 115. Measurement procedure manager 1030 may repeat the UE-to-UE measurement procedure and transmitting the feedback message based on: a periodic schedule, or an aperiodic schedule, or a change in receive power levels for a neighboring UE 115 above a threshold value, or a mobility state of the UE 115, or a combination thereof. In some cases, the UE-to-UE measurement procedure includes an NR CLI procedure.

Multi-group ID manager 1035 may receive a second group identifier that is associated with a second communication type, where the group identifier is associated with a first communication type.

Figure 11:
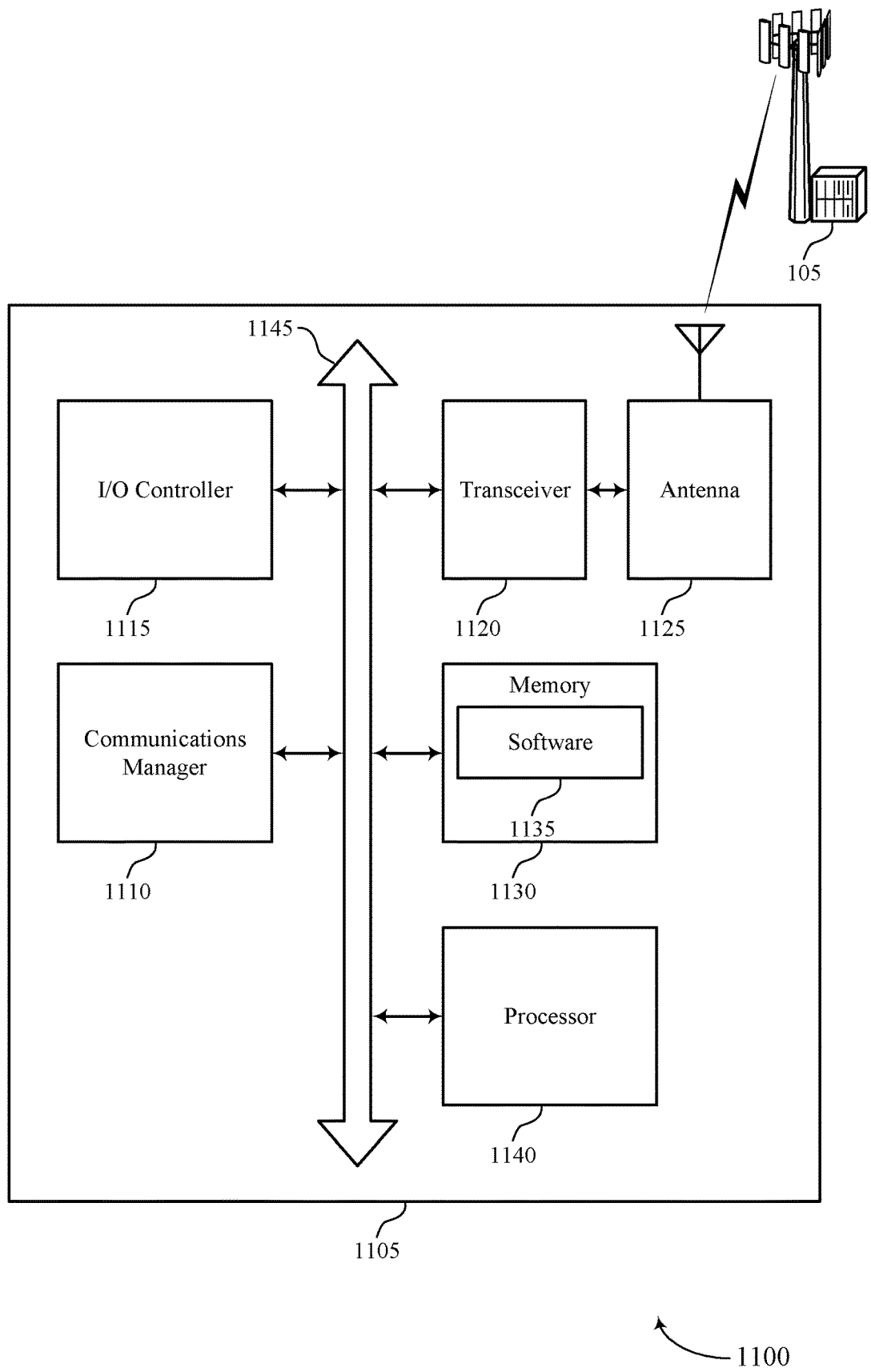
FIG. 11 illustrates a block diagram of a system including a UE that supports group based scheduled and autonomous uplink coexistence in accordance with aspects of the present disclosure.

FIG. 11 shows a diagram of a system 1100 including a device 1105 that supports group based scheduled and autonomous uplink coexistence in accordance with aspects of the present disclosure. Device 1105 may be an example of or include the components of UE 805, UE 905, or a UE 115 as described above, e.g., with reference to FIGS. 8 and 9. Device 1105 may include components for bi-directional voice and data communications including components for transmitting and receiving communications, including communications manager 1110, I/O controller 1115, transceiver 1120, antenna 1125, memory 1130, and processor 1140. These components may be in electronic communication via one or more buses (e.g., bus 1145).

I/O controller 1115 may manage input and output signals for device 1105. I/O controller 1115 may also manage peripherals not integrated into device 1105. In some cases, I/O controller 1115 may represent a physical connection or port to an external peripheral. In some cases, I/O controller 1115 may utilize an operating system such as iOS®, ANDROID®, MS-DOS®, MS-WINDOWS®, OS/2®, UNIX®, LINUX®, or another known operating system. In other cases, I/O controller 1115 may represent or interact with a modem, a keyboard, a mouse, a touchscreen, or a similar device. In some cases, I/O controller 1115 may be implemented as part of a processor. In some cases, a user may interact with device 1105 via I/O controller 1115 or via hardware components controlled by I/O controller 1115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device 1105 may include a single antenna 1125. However, in some cases the device 1105 may have more than one antenna 1125, which may be capable of concurrently transmitting or receiving multiple wireless transmissions.

Memory 1130 may include RAM and ROM. The memory 1130 may store computer-readable, computer-executable software 1135 including instructions that, when executed, cause the processor to perform various functions described herein. In some cases, the memory 1130 may contain, among other things, a BIOS which may control basic hardware or software operation such as the interaction with peripheral components or devices.

Processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1140 may be configured to operate a memory array using a memory controller. In other cases, a memory controller may be integrated into processor 1140. Processor 1140 may be configured to execute computer-readable instructions stored in a memory to perform various functions (e.g., functions or tasks supporting group based scheduled and autonomous uplink coexistence).

Figure 12:
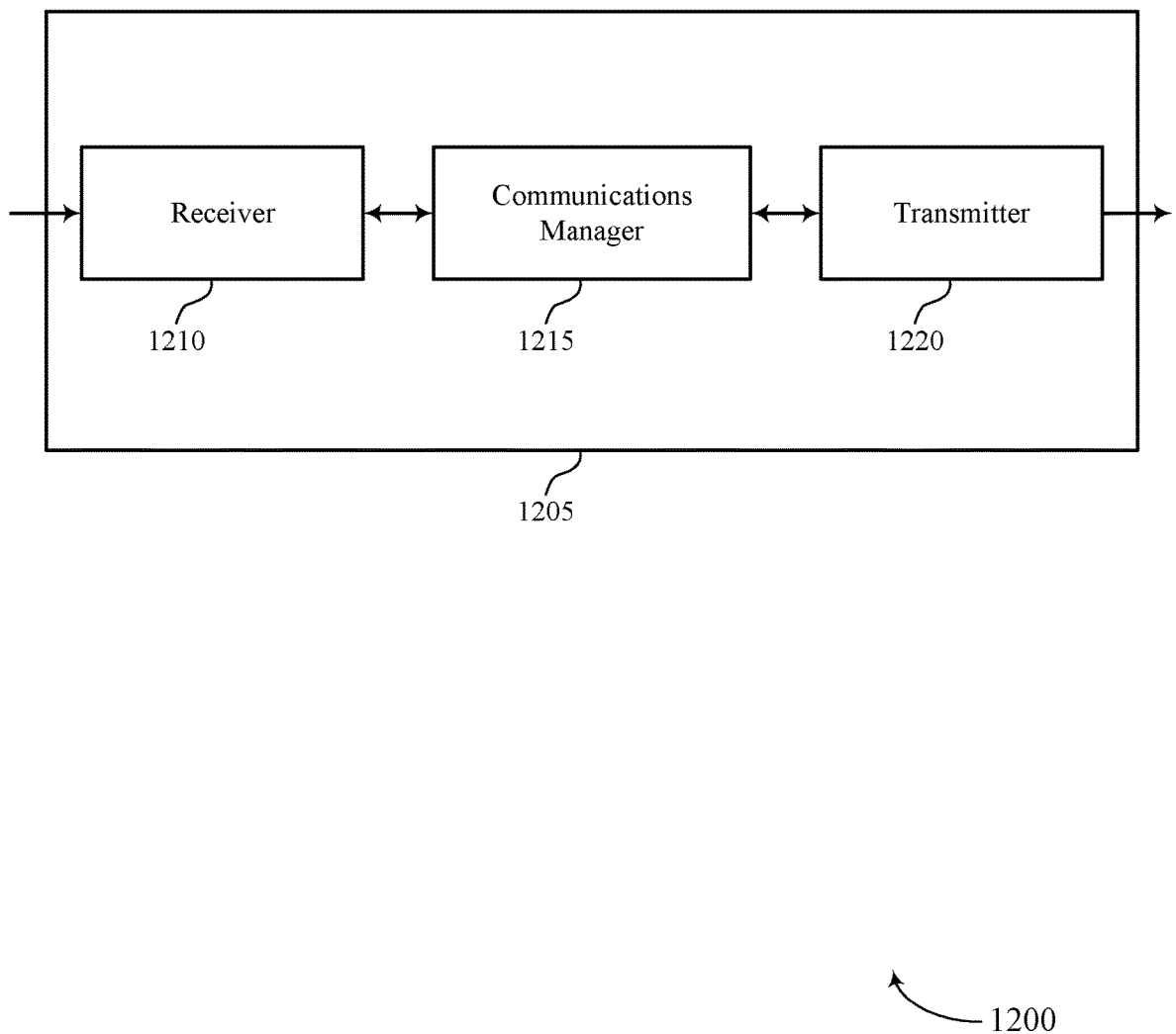
FIGS. 12 through 14 show block diagrams of a device that supports group based scheduled and autonomous uplink coexistence in accordance with aspects of the present disclosure.

FIG. 12 shows a block diagram 1200 of a base station 1205 that supports group based scheduled and autonomous uplink coexistence in accordance with aspects of the present disclosure. Base station 1205 may be an example of aspects of a base station 105 as described herein. Base station 1205 may include receiver 1210, communications manager 1215, and transmitter 1220. Base station 1205 may also include a processor. Each of these components may be in communication with one another (e.g., via one or more buses).

Receiver 1210 may receive information such as packets, user data, or control information associated with various information channels (e.g., control channels, data channels, and information related to group based scheduled and autonomous uplink coexistence, etc.). Information may be passed on to other components of the device 1205. The receiver 1210 may be an example of aspects of the transceiver 1520 described with reference to FIG. 15. The receiver 1210 may utilize a single antenna or a set of antennas.

Communications manager 1215 may be an example of aspects of the communications manager 1510 described with reference to FIG. 15.

Communications manager 1215 and/or at least some of its various sub-components may be implemented in hardware, software executed by a processor, firmware, or any combination thereof. If implemented in software executed by a processor, the functions of the communications manager 1215 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 1215 and/or at least some of its various sub-components may be physically located at various positions, including being distributed such that portions of functions are implemented at different physical locations by one or more physical devices. In some examples, communications manager 1215 and/or at least some of its various sub-components may be a separate and distinct component in accordance with various aspects of the present disclosure. In other examples, communications manager 1215 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 1215 may transmit, to a user equipment (UE) 115, a group identifier of the UE 115, transmit an indication of one or more group identifiers associated with scheduled communications with the base station during a time period, where the one or more group identifiers includes the group identifier of the UE 115, and receive an AUL transmission from the UE 115 over AUL resources during the time period based on the indication. The communications manager 1215 may also determine that a downlink communication to a UE 115 is to be performed using a first transmit beam in a mmW wireless communication system, transmit, using a second transmit beam that has a wider beam width than the first transmit beam, a reservation message providing an indication of the downlink communication, where the indication is conveyed in a common DCI, and perform the downlink communication to the UE 115 using the first transmit beam.

Transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
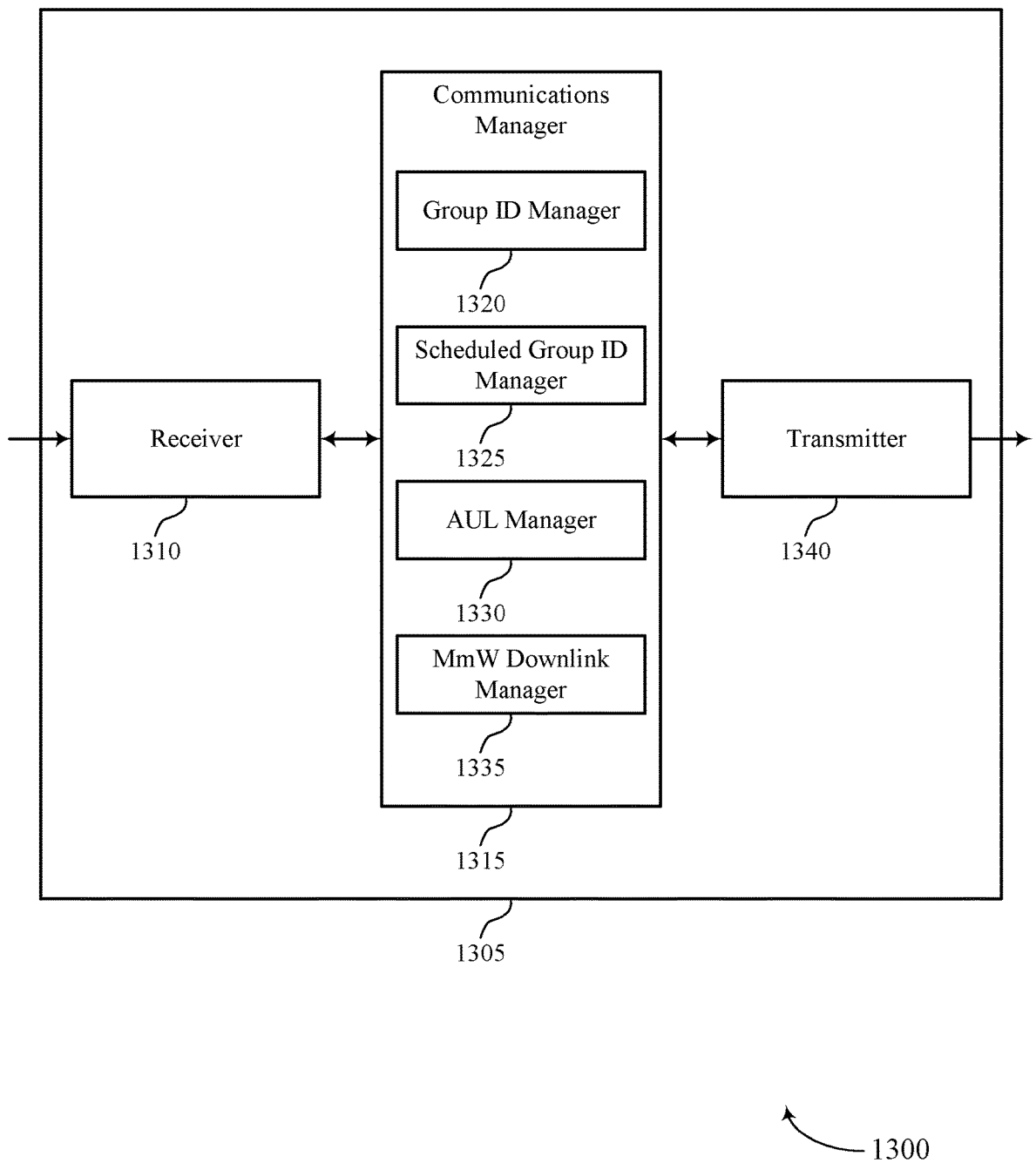

FIG. 13 shows a block diagram 1300 of a base station 1305 that supports group based scheduled and autonomous uplink coexistence in accordance with aspects of the present disclosure. Base station 1305 may be an example of aspects of a base station 1205 or a base station 105 as described with reference to FIGS. 1 and 1205. Base station 1305 may include receiver 1310, communications manager 1315, and transmitter 1340. Base station 1305 may also include a processor. Each of these components may be in communication with one another (e.g., via one or more buses).

Receiver 1310 may receive information such as packets, user data, or control information associated with various information channels (e.g., control channels, data channels, and information related to group based scheduled and autonomous uplink coexistence, etc.). Information may be passed on to other components of the device 1305. The receiver 1310 may be an example of aspects of the transceiver 1520 described with reference to FIG. 15. The receiver 1310 may utilize a single antenna or a set of antennas.

Communications manager 1315 may be an example of aspects of the communications manager 1510 described with reference to FIG. 15.

Communications manager 1315 may also include group ID manager 1320, scheduled group ID manager 1325, AUL manager 1330, and mmW downlink manager 1335.

Group ID manager 1320 may transmit, to a UE, a group identifier of the UE.

Scheduled group ID manager 1325 may transmit an indication of one or more group identifiers associated with scheduled communications with the base station during a time period, where the one or more group identifiers includes the group identifier of the UE.

AUL manager 1330 may receive an AUL transmission from the UE over AUL resources during the time period based on the indication.

mmW downlink manager 1335 may determine that a downlink communication to a UE is to be performed using a first transmit beam in a mmW wireless communication system. mmW downlink manager 1335 may transmit, using a second transmit beam that has a wider beam width than the first transmit beam, a reservation message providing an indication of the downlink communication, where the indication is conveyed in a common DCI. mmW downlink manager 1335 may perform the downlink communication to the UE using the first transmit beam.

Transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
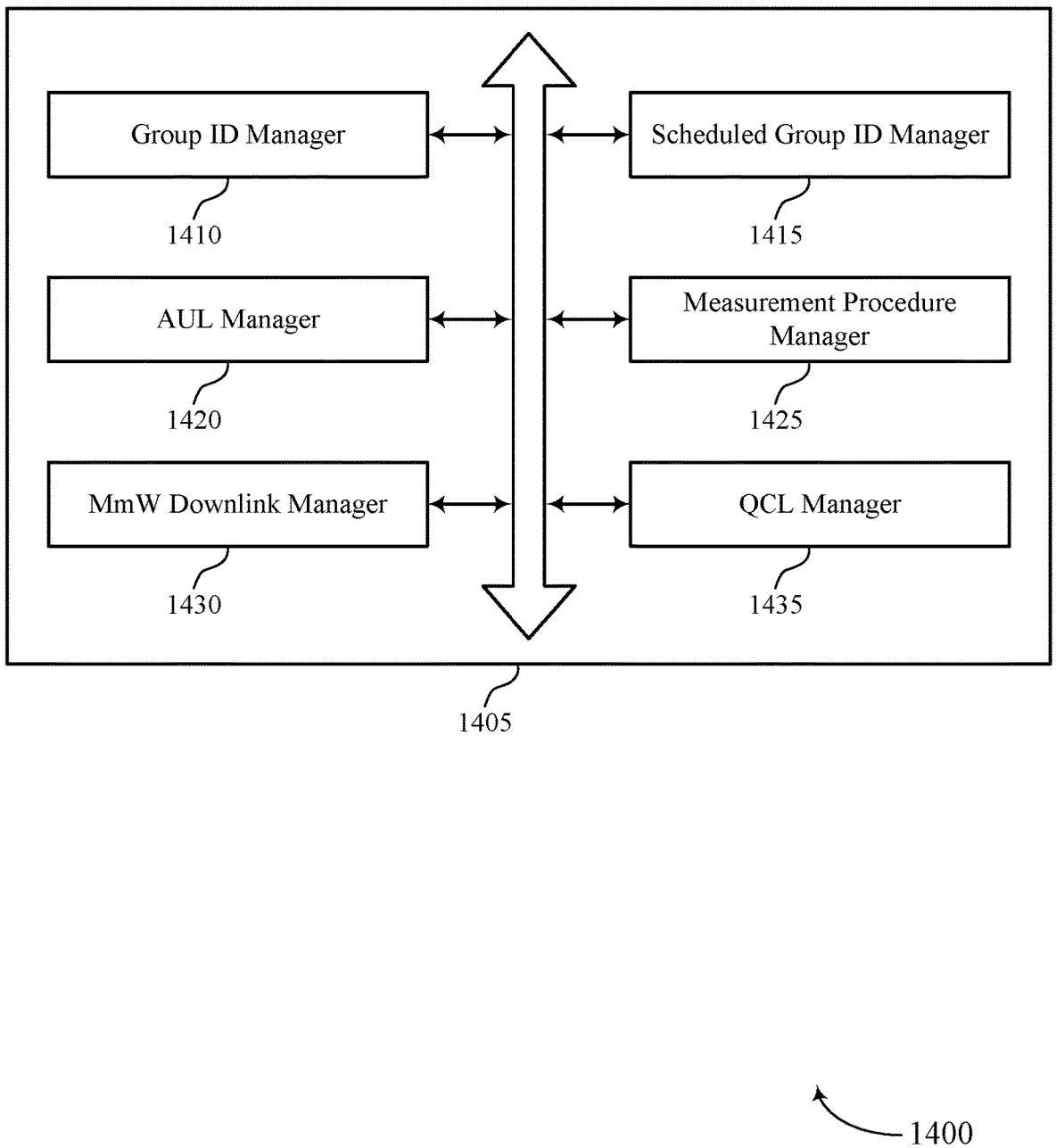

FIG. 14 shows a block diagram 1400 of a communications manager 1405 that supports group based scheduled and autonomous uplink coexistence in accordance with aspects of the present disclosure. The communications manager 1405 may be an example of aspects of a communications manager 1215, a communications manager 1315, or a communications manager 1510 described with reference to FIGS. 12, 13, and 15. The communications manager 1405 may include group ID manager 1410, scheduled group ID manager 1415, AUL manager 1420, measurement procedure manager 1425, mmW downlink manager 1430, and QCL manager 1435. Each of these modules may communicate, directly or indirectly, with one another (e.g., via one or more buses).

Group ID manager 1410 may transmit, to a UE 115, a group identifier of the UE 115. In some cases, a common DCI, or a MAC CE, or an RRC message, or a combination thereof.

Scheduled group ID manager 1415 may transmit an indication of one or more group identifiers associated with scheduled communications with the base station during a time period, where the one or more group identifiers includes the group identifier of the UE 115.

AUL manager 1420 may receive an AUL transmission from the UE 115 over AUL resources during the time period based on the indication.

mmW downlink manager 1430 may determine that a downlink communication to a UE 115 is to be performed using a first transmit beam in a mmW wireless communication system. mmW downlink manager 1430 may transmit, using a second transmit beam that has a wider beam width than the first transmit beam, a reservation message providing an indication of the downlink communication, where the indication is conveyed in a DCI. mmW downlink manager 1430 may perform the downlink communication to the UE using the first transmit beam. In some cases, the first transmit beam may be a P1 transmit beam or a P2 transmit beam. In some cases, the first transmit beam includes a P3 transmit beam.

Measurement procedure manager 1425 may receive from each UE 115 of a set of UEs 115, an indication of neighboring UEs 115. Measurement procedure manager 1425 may group the set of UEs 115 into the one or more groups of UEs 115 based on the neighboring UEs 115. Measurement procedure manager 1425 may schedule communications for each of the one or more groups of UEs 115 according to the grouping. Measurement procedure manager 1425 may determine, based on the feedback messages, that one or more neighboring UEs 115 to a UE 115 are associated with receive power levels above a threshold value, where grouping the set of UEs 115 into one or more groups of UEs 115 includes grouping the UE 115 associated with the feedback message and the one or more neighboring UEs 115 into a group of UEs 115. Measurement procedure manager 1425 may repeat the receiving of the feedback messages and grouping the set of UEs 115 based on: a periodic schedule, or an aperiodic schedule, or a change in receive power levels between neighboring UEs 115 above a threshold value, or a mobility state of one or more UEs 115 in the set of UEs 115, or a combination thereof. In some cases, the indication of the neighboring UEs 115 is received in a feedback message that is based on UE-to-UE measurement procedures performed between the set of UEs 115. In some cases, the grouping is based on the feedback messages.

QCL manager 1435 may identify one or more neighboring UEs 115 of the UE 115 that are configured for AUL communications and QCL the common DCI with a DCI that the one or more neighboring UEs 115 are configured to monitor for the AUL communications.

Figure 15:
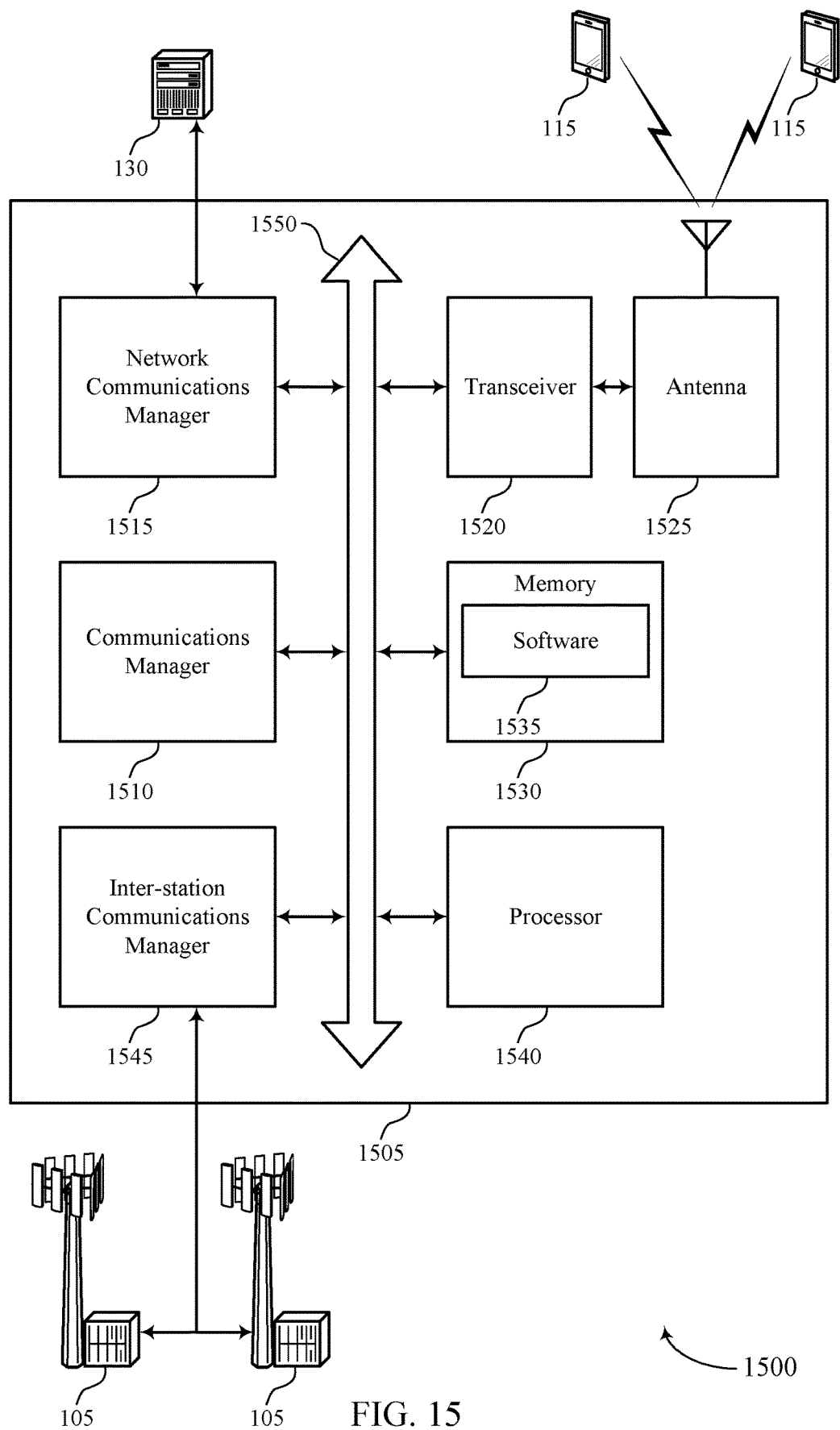
FIG. 15 illustrates a block diagram of a system including a base station that supports group based scheduled and autonomous uplink coexistence in accordance with aspects of the present disclosure.

FIG. 15 shows a diagram of a system 1500 including a device 1505 that supports group based scheduled and autonomous uplink coexistence in accordance with aspects of the present disclosure. Device 1505 may be an example of or include the components of base station 1205, base station 1305, or a base station 105 as described above, e.g., with reference to FIGS. 12 and 13. Device 1505 may include components for bi-directional voice and data communications including components for transmitting and receiving communications, including communications manager 1510, network communications manager 1515, transceiver 1520, antenna 1525, memory 1530, processor 1540, and inter-station communications manager 1545. These components may be in electronic communication via one or more buses (e.g., bus 1550).

Network communications manager 1515 may manage communications with the core network (e.g., via one or more wired backhaul links). For example, the network communications manager 1515 may manage the transfer of data communications for client devices, such as one or more UEs 115.

Transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device 1505 may include a single antenna 1525. However, in some cases the device 1505 may have more than one antenna 1525, which may be capable of concurrently transmitting or receiving multiple wireless transmissions.

Memory 1530 may include RAM and ROM. The memory 1530 may store computer-readable, computer-executable software 1535 including instructions that, when executed, cause the processor to perform various functions described herein. In some cases, the memory 1530 may contain, among other things, a BIOS which may control basic hardware or software operation such as the interaction with peripheral components or devices.

Processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1540 may be configured to operate a memory array using a memory controller. In other cases, a memory controller may be integrated into processor 1540. Processor 1540 may be configured to execute computer-readable instructions stored in a memory to perform various functions (e.g., functions or tasks supporting group based scheduled and autonomous uplink coexistence).

Inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, inter-station communications manager 1545 may provide an X2 interface within an LTE/LTE-A wireless communication network technology to provide communication between base stations 105.

Figure 16:
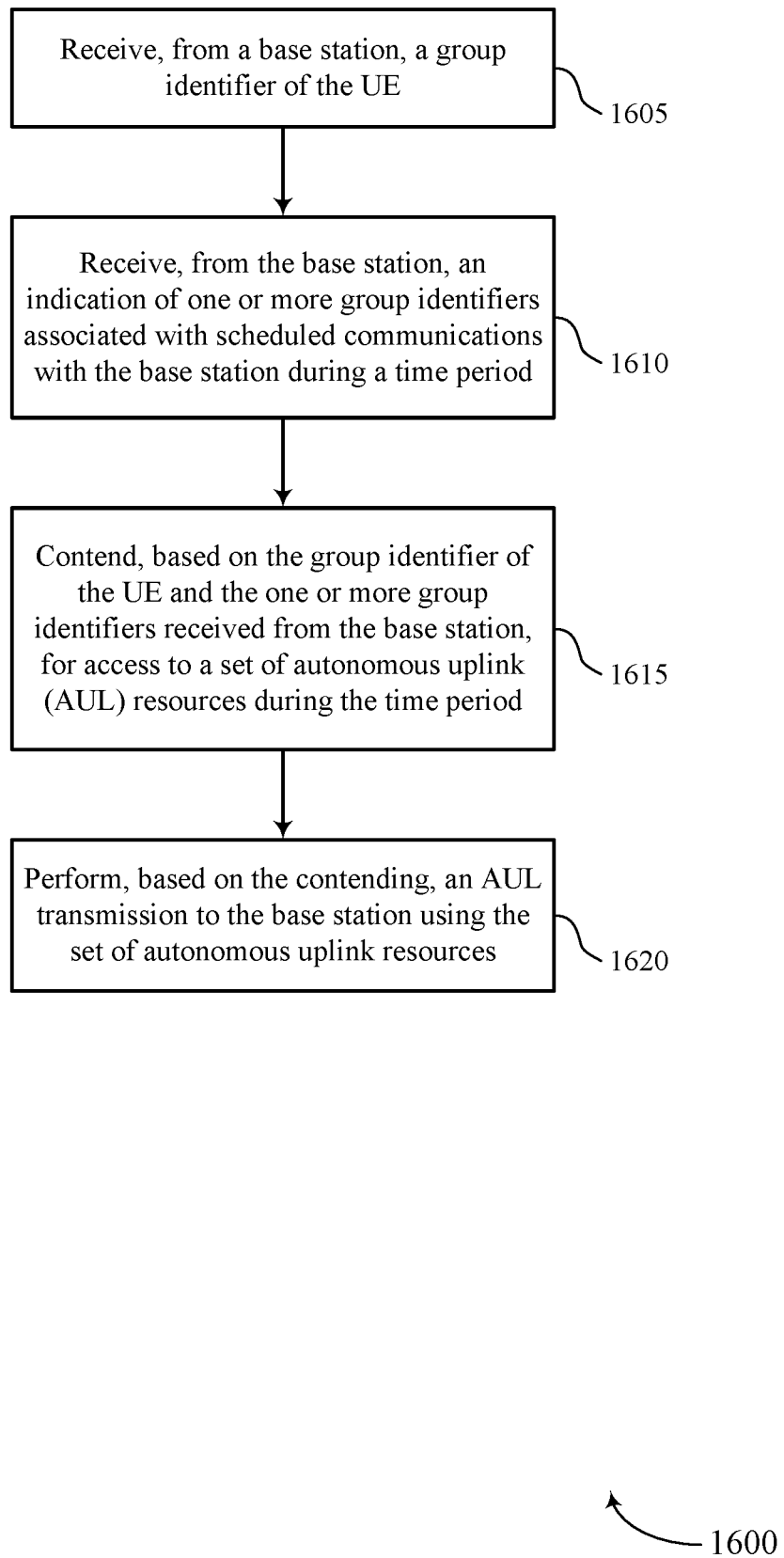
FIGS. 16 through 18 illustrate methods for group based scheduled and autonomous uplink coexistence in accordance with aspects of the present disclosure.

FIG. 16 shows a flowchart illustrating a method 1600 for group based scheduled and autonomous uplink coexistence in accordance with aspects of the present disclosure. The operations of method 1600 may be implemented by a UE 115 or its components as described herein. For example, the operations of method 1600 may be performed by a communications manager as described with reference to FIGS. 8 to 11. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may receive, from a base station, a group identifier of the UE 115. The operations of 1605 may be performed according to the methods described herein. In certain examples, aspects of the operations of 1605 may be performed by a group ID manager as described with reference to FIGS. 8 to 11.

At 1610, the UE 115 may receive, from the base station 105, an indication of one or more group identifiers associated with scheduled communications with the base station during a time period. The operations of 1610 may be performed according to the methods described herein. In certain examples, aspects of the operations of 1610 may be performed by a scheduled group ID manager as described with reference to FIGS. 8 to 11.

At 1615, the UE 115 may contend, based on the group identifier of the UE 115 and the one or more group identifiers received from the base station 105, for access to a set of AUL resources during the time period. The operations of 1615 may be performed according to the methods described herein. In certain examples, aspects of the operations of 1615 may be performed by a contention manager as described with reference to FIGS. 8 to 11.

At 1620, the UE 115 may perform, based on the contending, an AUL transmission to the base station using the set of autonomous uplink resources. The operations of 1620 may be performed according to the methods described herein. In certain examples, aspects of the operations of 1620 may be performed by an AUL manager as described with reference to FIGS. 8 to 11.

Figure 17:
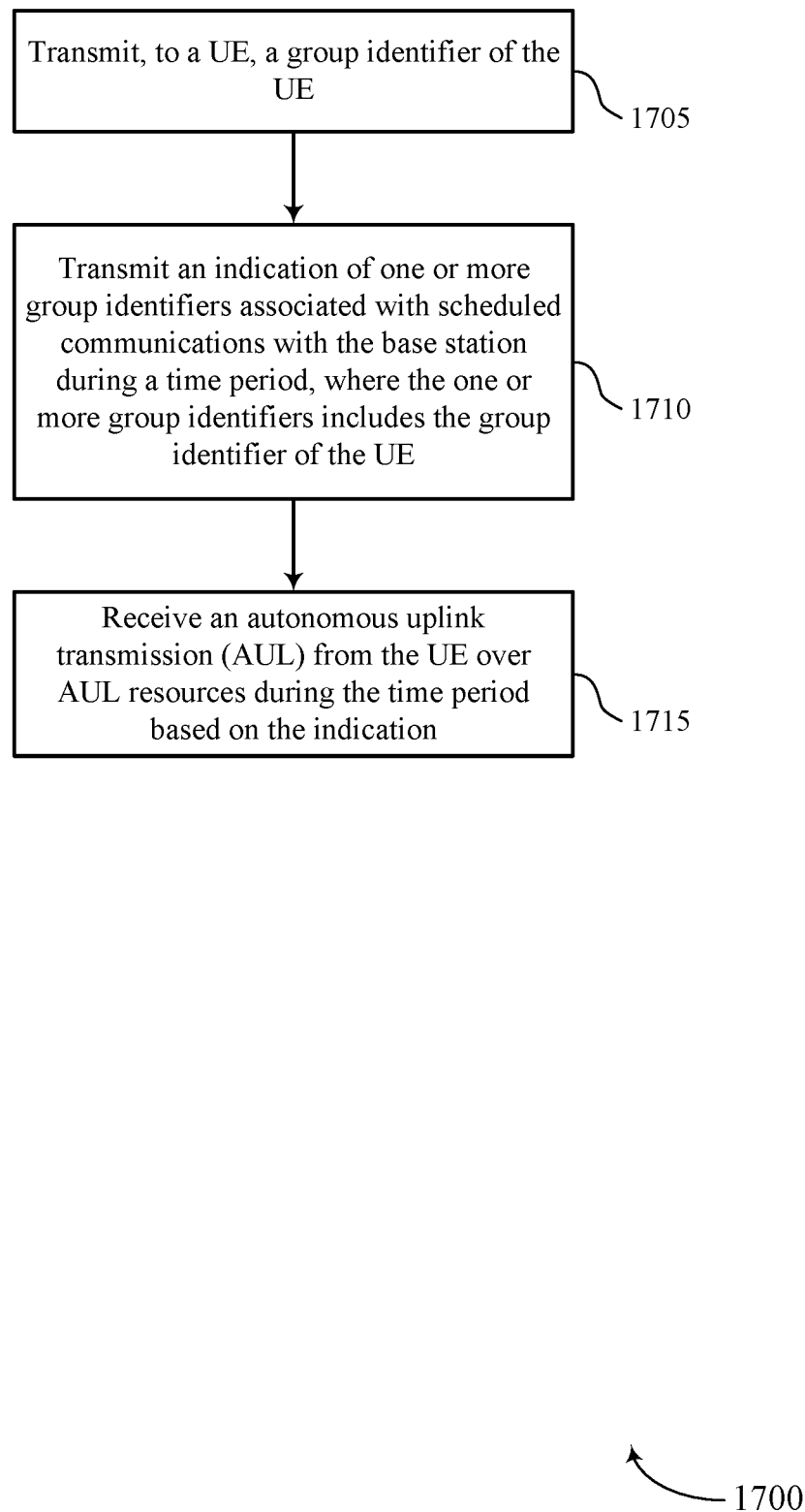

FIG. 17 shows a flowchart illustrating a method 1700 for group based scheduled and autonomous uplink coexistence in accordance with aspects of the present disclosure. The operations of method 1700 may be implemented by a base station or its components as described herein. For example, the operations of method 1700 may be performed by a communications manager as described with reference to FIGS. 12 to 15. In some examples, a base station may execute a set of codes to control the functional elements of the device to perform the functions described below. Additionally or alternatively, the base station may perform aspects of the functions described below using special-purpose hardware.

At 1705, the base station 105 may transmit, to a UE 115, a group identifier of the UE 115. The operations of 1705 may be performed according to the methods described herein. In certain examples, aspects of the operations of 1705 may be performed by a group ID manager as described with reference to FIGS. 12 to 15.

At 1710, the base station 105 may transmit an indication of one or more group identifiers associated with scheduled communications with the base station 105 during a time period, where the one or more group identifiers includes the group identifier of the UE 115. The operations of 1710 may be performed according to the methods described herein. In certain examples, aspects of the operations of 1710 may be performed by a scheduled group ID manager as described with reference to FIGS. 12 to 15.

At 1715, the base station 105 may receive an AUL transmission from the UE 115 over AUL resources during the time period based on the indication. The operations of 1715 may be performed according to the methods described herein. In certain examples, aspects of the operations of 1715 may be performed by an AUL manager as described with reference to FIGS. 12 to 15.

Figure 18:
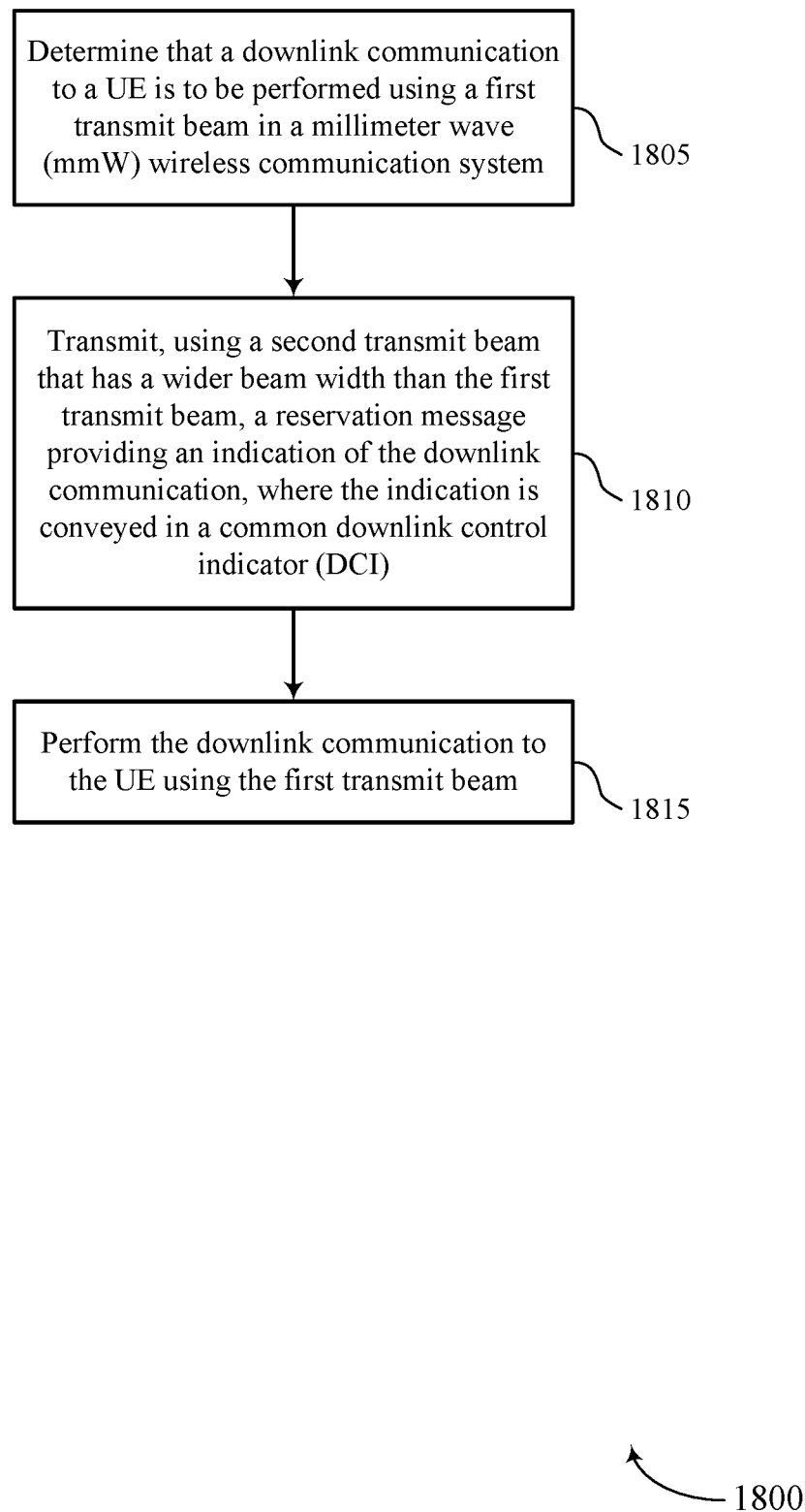

FIG. 18 shows a flowchart illustrating a method 1800 for group based scheduled and autonomous uplink coexistence in accordance with aspects of the present disclosure. The operations of method 1800 may be implemented by a base station or its components as described herein. For example, the operations of method 1800 may be performed by a communications manager as described with reference to FIGS. 12 to 15. In some examples, a base station may execute a set of codes to control the functional elements of the device to perform the functions described below. Additionally or alternatively, the base station may perform aspects of the functions described below using special-purpose hardware.

At 1805, the base station 105 may determine that a downlink communication to a UE 115 is to be performed using a first transmit beam in a mmW wireless communication system. The operations of 1805 may be performed according to the methods described herein. In certain examples, aspects of the operations of 1805 may be performed by a mmW downlink manager as described with reference to FIGS. 12 to 15.

At 1810, the base station 105 may transmit, using a second transmit beam that has a wider beam width than the first transmit beam, a reservation message providing an indication of the downlink communication, where the indication is conveyed in a common DCI. The operations of 1810 may be performed according to the methods described herein. In certain examples, aspects of the operations of 1810 may be performed by a mmW downlink manager as described with reference to FIGS. 12 to 15.

At 1815, the base station 105 may perform the downlink communication to the UE 115 using the first transmit beam. The operations of 1815 may be performed according to the methods described herein. In certain examples, aspects of the operations of 1815 may be performed by a mmW downlink manager as described with reference to FIGS. 12 to 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
    determining that a downlink communication to a user equipment (UE) is to be performed using a first transmit beam in a millimeter wave (mmW) wireless communication system;
    identifying one or more neighboring UEs of the UE that are configured for autonomous uplink (AUL) communications;
    transmitting, using a second transmit beam that has a wider beam width than the first transmit beam, a reservation message providing an indication of the downlink communication, wherein the indication is conveyed in a common downlink control indicator (DCI), and wherein the common DCI is quasi co-located with a DCI that the one or more neighboring UEs are configured to monitor for the AUL communications; and
    performing the downlink communication to the UE using the first transmit beam.

2. The method of claim 1, wherein the second transmit beam comprises at least one of: a P1 transmit beam or a P2 transmit beam.

3. The method of claim 1, wherein the first transmit beam comprises a P3 transmit beam.

4. An apparatus for wireless communications, comprising:
    one or more processors;
    memory in electronic communication with the one or more processors; and
    instructions stored in the memory, wherein the instructions are executable by the one or more processors to cause the apparatus to:
        determine that a downlink communication to a user equipment (UE) is to be performed using a first transmit beam in a millimeter wave (mmW) wireless communication system;
        identify one or more neighboring UEs of the UE that are configured for autonomous uplink (AUL) communications;
        transmit, using a second transmit beam that has a wider beam width than the first transmit beam, a reservation message providing an indication of the downlink communication, wherein the indication is conveyed in a common downlink control indicator (DCI), and wherein the common DCI is quasi co-located with a DCI that the one or more neighboring UEs are configured to monitor for the AUL communications; and
        perform the downlink communication to the UE using the first transmit beam.

5. The apparatus of claim 4, wherein the second transmit beam comprises at least one of: a P1 transmit beam or a P2 transmit beam.

6. The apparatus of claim 4, wherein the first transmit beam comprises a P3 transmit beam.

* * * * *